(12) United States Patent
Patil et al.

(10) Patent No.: US 11,294,929 B1
(45) Date of Patent: Apr. 5, 2022

(54) SMART WATER DATA ANALYTICS

(71) Applicant: AEEC, Reston, VA (US)

(72) Inventors: Raj Patil, Reston, VA (US); Anna Edstrom, Salt Lake City, UT (US); Kalem Sessions, Salt Lake City, UT (US)

(73) Assignee: AEEC, Reston, VI (US)

( * ) Notice: Subject to any disclaimer, the term of this patent is extended or adjusted under 35 U.S.C. 154(b) by 0 days.

(21) Appl. No.: 17/342,773

(22) Filed: Jun. 9, 2021

(51) Int. Cl.
*G06F 16/26* (2019.01)
*G06F 16/25* (2019.01)
*G06N 20/00* (2019.01)
*G06F 16/27* (2019.01)
*G06F 16/2455* (2019.01)

(52) U.S. Cl.
CPC ........ *G06F 16/26* (2019.01); *G06F 16/24568* (2019.01); *G06F 16/254* (2019.01); *G06F 16/258* (2019.01); *G06F 16/275* (2019.01); *G06N 20/00* (2019.01)

(58) Field of Classification Search
CPC .. G06F 16/26; G06F 16/24568; G06F 16/254; G06F 16/258; G06F 16/275; G06N 20/00
See application file for complete search history.

(56) References Cited

U.S. PATENT DOCUMENTS

| | | | |
|---|---|---|---|
| 5,953,424 A | 9/1999 | Vogelesang et al. | |
| 7,032,816 B2 | 4/2006 | Markham et al. | |
| 7,667,087 B2 | 2/2010 | Ball | |
| 8,458,596 B1 | 6/2013 | Malks et al. | |
| 8,688,459 B2 | 4/2014 | Nenov et al. | |
| 8,838,957 B2 | 9/2014 | Chou et al. | |
| 9,147,296 B2 | 9/2015 | Ricci | |
| 9,460,184 B2 | 10/2016 | Lasky et al. | |
| 10,135,705 B2 | 11/2018 | Asenjo et al. | |
| 10,142,327 B2 | 11/2018 | Mohamad Abdul et al. | |
| 10,235,439 B2 | 3/2019 | Sullivan et al. | |
| 10,296,843 B2 | 5/2019 | Siebel et al. | |
| 10,406,399 B2 | 9/2019 | Bentley et al. | |
| 10,568,510 B2 | 2/2020 | Mensinger et al. | |

(Continued)

FOREIGN PATENT DOCUMENTS

| | | |
|---|---|---|
| CN | 110825041 A | 2/2020 |
| EP | 3695030 A1 | 8/2020 |
| WO | 2019/239422 A1 | 12/2019 |

*Primary Examiner* — Cam Y T Truong
(74) *Attorney, Agent, or Firm* — Dave Law Group LLC; Raj S. Dave

(57) ABSTRACT

A system comprising: a centralized data acquisition subsystem to receive input data from one or more data silos; a data storage subsystem adapted to process, and store the received input data; a bridge application subsystem to securely ingest the received input data from the centralized data acquisition subsystem into the data storage subsystem; wherein the bridge application subsystem comprises a custom bridge program subscription; a data refining subsystem that is connected to the data storage subsystem and refines the input data acquired by the data storage subsystem, removes abnormal data and stores refined input data after refining; a predictive analytical subsystem is configured to generate output data using the refined input data from the data storage subsystem for processing and computing the input data to create a predictive analysis.

20 Claims, 24 Drawing Sheets

(56) References Cited

U.S. PATENT DOCUMENTS

| | | |
|---|---|---|
| 10,682,071 B2 | 6/2020 | Behzadi |
| 10,692,032 B2 | 6/2020 | Datta |
| 10,786,649 B2 | 9/2020 | Mclaughlin et al. |
| 10,824,634 B2 | 11/2020 | Siebel et al. |
| 10,831,726 B2 | 11/2020 | Soza |
| 10,954,144 B2 | 3/2021 | Ball et al. |
| 2003/0139905 A1* | 7/2003 | Helsper ............... G06F 11/3055 702/182 |
| 2010/0198804 A1 | 8/2010 | Yaskin et al. |
| 2013/0087512 A1 | 4/2013 | Ball |
| 2015/0228012 A1 | 8/2015 | Thomas |
| 2017/0093910 A1 | 3/2017 | Gukal et al. |
| 2018/0068083 A1 | 3/2018 | Cohen et al. |
| 2019/0069022 A1 | 2/2019 | Moussavian et al. |
| 2019/0266530 A1 | 8/2019 | Marshall |
| 2019/0377743 A1 | 12/2019 | Gupta |
| 2019/0383783 A1 | 12/2019 | Azpiroz et al. |
| 2019/0386828 A1 | 12/2019 | Garcia et al. |
| 2020/0065759 A1 | 2/2020 | McNamara et al. |
| 2020/0067789 A1 | 2/2020 | Khuti et al. |
| 2020/0104639 A1* | 4/2020 | Didari ................... G06K 9/6257 |
| 2020/0128094 A1 | 4/2020 | De lavarene et al. |
| 2020/0258120 A1 | 8/2020 | Ardulov et al. |

\* cited by examiner

ARCHITECTURE SMARTWATER DATA ANALYTICS – GROUND ZERO

SMART WATER DATA ANALYTICS

FIELD OF THE INVENTION

The present disclosure relates broadly to data ingestion, storage, processing, predictive analysis, and more particularly relates to the kind of securely automated data analytical system designed for the water industry.

BACKGROUND

As infrastructure ages and technology advances, the water and wastewater industry finds itself facing distinct challenges. According to the 2018 "State of the Water Industry Report" from the American Water Works Association, the top challenge in the industry is the problem of aging infrastructure. Furthermore, issues such as data management, cost recovery, and public understanding of the value of water all ranked in the top 15 challenges. The report also questioned survey-takers on their current big data capabilities and what technologies they were utilizing for data management. Only 17% reported the full implementation of cloud technologies, and nearly 50% reported that they were not currently using big data techniques (such as data mining) to better understand their systems. [Source: "State of the Water Industry Report" (2018) [PDF] American Water Works Association. Available at http://www.awwa.org [Accessed 12 Nov. 2019]

Industrial IoT capabilities provide many potential solutions to the challenges the water industry is facing. Particularly, artificial intelligence, machine learning, predictive analysis, and data analytics tools can be used to mitigate issues of aging infrastructure and cost recovery. The market size for industrial IoT is growing rapidly, with a projected size of "more than $200 billion prevent many utilities from embracing IoT technology. These concerns lead to technological stagnation within water utilities, but solutions exist for overcoming them". [M. Schallehn, C. Schorling, P. Bowen, and O. Straehle. "Beyond Proofs of Concept: Scaling the Industrial IoT." (30 Jan. 2019). [PDF] Bain & Company. Available at: http://www.bain.com/insights/beyond-proofs-of-concept-scaling-the-industrial-iot/ [Accessed 28 Jan. 2020]

"Systems, methods, and devices for a cyberphysical (IoT) software application development platform based upon a model driven architecture and derivative IoT SaaS applications are disclosed herein. The system may include concentrators to receive and forward time-series data from sensors or smart devices. The system may include message decoders to receive messages comprising the time-series data and storing the messages on message queues. The system may include a persistence component to store the time-series data in a key-value store and store the relational data in a relational database. The system may include a data services component to implement a type layer over data stores. The system may also include a processing component to access and process data in the data stores via the type layer, the processing component comprising a batch processing component and an iterative processing component." [Source: U.S. Ser. No. 10/824,634B2 "Systems, methods, and devices, for an enterprise AI and internet-of-things platform"]

"They feature architectures to meet the strategic Industry 4.0 needs of enterprises into the future; functionality that ingests data from different industrial protocols and systems at the edge cloud, with each data connection defined as microservices to facilitate the delivery of predictive analytics and application functionality. Such cloud systems, moreover, can support multi-tenancy by client and asset, allowing data for multiple customers (e.g., enterprises) to be transmitted to, stored on, and/or processed within a single, cloud-based data processing system without risk of data commingling or risk to data security. Multi-tenancy further facilitates the delivery of Industrial SaaS (software as a service) application functionality by taking advantage of economies of scale, pay on usage, lower cost and re-use." [Source: US20200067789 "Systems and methods for distributed systematic anticipatory industrial asset intelligence"]

The Supervisory Control and Data Acquisition (SCADA) and process monitoring systems data used for executive and regulatory reports is often pulled from separate data silos within an organization. The disparate nature of the data results in a limited ability to pull it into a single, secure, accessible location like a data lake. Data lakes provide vast benefits to organizations because they enable data analytics and visualization to be done through automation.

Considering the knowledge of the persons skilled in the art, there is a long-felt need for a solution to enable IoT capabilities for water and wastewater utilities and an analytical system that can be customized to any organization's operational environment, processes, customer base, and that consolidates discrete systems into a centralized, robust, secure platform with advanced data processing tools.

SUMMARY

Smart water data analytics consolidates discrete systems into a centralized, robust, secure platform with advanced data processing tools. This consolidation allows utilities to improve the quality of their data environment as well as scale up their analytic capability enterprise-wide. The dashboard interface subsystem makes it easy to generate reports and access the data necessary for decision making, leading to cost-savings and more efficient operational practices. It also enables active monitoring, which provides organizations with the ability to respond rapidly to changing situations. Furthermore, predictive analysis empowers the organizations by supplementing their future planning through the availability of historic data and predicted trends. Predictions can also be used to address potential problems, such as aging infrastructure or water scarcity before they even occur. The system is implemented on a secure platform by using the high level of security provided by the cloud.

One or more aspects of methods and systems of smart water data analytics is described herein.

In one aspect, a system comprising: a centralized data acquisition subsystem operable to receive input data from one or more data silos; a data storage subsystem adapted operable to process, and store the received input data; a bridge application subsystem operable to securely ingest the received input data from the centralized data acquisition subsystem into the data storage subsystem; wherein the bridge application subsystem comprises a custom bridge program subscription; a data refining subsystem that is connected to the data storage subsystem and operable to refine the input data acquired by the data storage subsystem, remove abnormal data and store refined input data after refining; a predictive analytical subsystem operable to generate output data using the refined input data from the data storage subsystem, process and compute the input data to create a predictive analysis; a dashboard interface subsystem operable to automatically access of the data in the data storage subsystem, analysis, generation of metrics and analytics report based on the output data of the predictive analytical subsystem; a data visualization subsystem operable to generate visual representation of data comprises one or more of graphs, charts, tables and reports; wherein the bridge application subsystem is operable to receive the input data in any one of multiple formats and multiple sources and processes that data effectively; and wherein format of the data is independent of the custom bridge program subscription.

In yet another embodiment, the centralized data acquisition subsystem, the data storage subsystem, the bridge application subsystem, the data refining subsystem, the predictive analytical subsystem, the dashboard interface subsystem, and the data visualization subsystem operate automatically.

In yet another embodiment, the centralized data acquisition subsystem comprises a Supervisory Control and Data Acquisition (SCADA) server.

In yet another embodiment, the data refining subsystem comprises an error analysis unit and an error data removal unit; wherein the error analysis unit analyzes the input data acquired by the SCADA server, determines abnormal data, and sends an analysis result to the error data removal unit; and wherein the error data removal unit removes the abnormal data.

In yet another embodiment, the data storage subsystem comprises any one of databases, data warehouses, and data lakes.

In yet another embodiment, the data storage subsystem further comprises a cloud-based data storage subsystem.

In yet another embodiment, the data uploaded from the SCADA server to a cloud-based data storage subsystem is automatic and uniform.

In yet another embodiment, the data is transmitted in a cloud vendor agnostic way to the cloud-based data storage subsystem.

In yet another embodiment, the predictive analytical subsystem comprises statistical techniques, predictive modelling, machine learning, and data mining that analyzes current and historical facts to make predictions of any one of future and otherwise unknown events.

In yet another embodiment, the system is configured with the machine learning to operate in an automated feedforward manner.

In yet another embodiment, the predictive analytical subsystem analyzes one or more equipment and system data, wherein the data collected from sensors, the SCADA server, asset data, geospatial data, maintenance data, engineering data, and external data sets, and wherein the external data sets comprise any one of weather and terrain data.

In yet another embodiment, data transmitted from the SCADA server to the data storage subsystem is encrypted using cryptographic protocols in transit before leaving a local network.

In yet another embodiment, the cryptographic protocols comprise one of Transport Layer Security (TLS) protocols.

In yet another embodiment, an Application Programming Interface (API) authentication mechanism protects the data in the data storage subsystem from unauthorized access wherein interactions throughout the system are tracked and are accessible via the API, enabling users to visualize the data in an app of their choice.

In yet another embodiment, the data displayed on the dashboard interface subsystem remains up to date, according to most recent data uploaded to the data storage subsystem.

In yet another embodiment, the dashboard interface subsystem presents the output data using the input data in an easy-to-read view.

In yet another embodiment, a landing page of the dashboard interface subsystem serves as an overview of data stored in the data storage subsystem, giving users a concise view of the data.

In yet another embodiment, the dashboard interface subsystem comprises any one of web-based and mobile based dashboard interface subsystems.

In yet another embodiment, the system is applicable in water treatment plants.

In yet another embodiment, the predictive analytical subsystem comprises data from external sources which further comprises one or more of temperature, precipitation, snowpack, river flow rate, weather data, and system flow rate.

In yet another embodiment, the one or more of graphs, charts, tables and reports are of one or more parameters; and wherein the parameters comprise one or more of pH, flow rate, turbidity, Oxidation Reduction Potential (ORP) and Dissolved Oxygen (DO).

In yet another embodiment, the received input data comprises environmental engineering data.

In yet another embodiment, a method comprising: collecting data from a Supervisory Control and Data Acquisition (SCADA) server through a bridge application subsystem and transmitting the data into a data storage subsystem, wherein the bridge application subsystem comprises a custom bridge program; and performing automated ingestion of the data from the SCADA server into the data storage subsystem.

In yet another embodiment, the custom bridge program comprises connectivity protocols; and wherein the connectivity protocols comprise any one of a native Modbus of the SCADA server, Open Platform Communications (OPC) and Open Database Connectivity (ODBC) drivers to read data from the SCADA server.

In yet another embodiment, the custom bridge program acts as a bridge between the connectivity protocols and the data storage subsystem.

In yet another embodiment, the data storage subsystem comprises any one of databases, data warehouses and data lakes.

In yet another embodiment, the method is an instantaneous and event driven process.

In yet another embodiment, collection of data from the SCADA server is via a scheduled SQL Query; wherein the scheduled SQL Query collects latest values from selected data points from the data from the SCADA server; producing a Comma-Separated Values (CSV) file; wherein the produced CSV files have a current timestamp and current values; wherein the custom bridge program watches the CSV files for modification and processes new entries as they occur; wherein the custom bridge program transmits the collection of the latest values to the data storage subsystem; and wherein the data storage subsystem further comprises a cloud-based data storage subsystem.

In yet another embodiment, the data storage subsystem comprises databases, data warehouses and data lakes.

In yet another embodiment, the custom bridge program is adapted to read, process the CSV file, and ingest it into the data storage subsystem; and wherein the custom bridge program uses a vendor provided client library.

In yet another embodiment, logging is performed to determine causes of any errors; and archiving the CSV file for later reference.

In yet another embodiment, the method runs on a schedule and processes data from a batch.

In yet another embodiment, the method is agnostic to the cloud-based data storage subsystem.

In an embodiment, a method comprising: receiving data from one or more of data sources by a centralized data acquisition subsystem; ingesting the data into a data storage subsystem for machine learning and predictive analysis; computing output data using input data from the data storage subsystem, creating a predictive model and providing input to improve and enhance a system; transferring the output data, instructions and conducting transactions between multiple users; generating periodical reports to a user based on the predictive model; retraining automatically and updating prediction by integrating new available data; and creating a predictive model of the system.

In an embodiment, a non-transitory computer storage medium storing a sequence of instructions, which when executed by a processor, causes receiving data from one or more of data sources by a centralized data acquisition subsystem; refining data acquired by the centralized data acquisition subsystem and removing abnormal data; ingesting data into a data storage subsystem for machine learning and predictive analysis; wherein a bridge application securely ingests data from SCADA server into the data storage subsystem; computing output data using input data from the data storage subsystem, creating a predictive model and providing input to improve and enhance a system; transferring the output data, instructions and conducting transactions between multiple users; generating periodical reports to users by a dashboard interface subsystem based on the predictive model; retraining automatically and updating prediction by integrating new available data; and creating a predictive model of the system.

BRIEF DESCRIPTION OF THE DRAWINGS

In the present disclosure, reference is made to the accompanying drawings, which form a part hereof. In the drawings, similar symbols typically identify similar components, unless context dictates otherwise. Various embodiments described in the detailed description, and drawings, are illustrative and not meant to be limiting. Other embodiments may be used, and other changes may be made, without departing from the spirit or scope of the subject matter presented herein. It will be understood that the aspects of the present disclosure, as generally described herein, and illustrated in the figures, can be arranged, substituted, combined, separated, and designed in a wide variety of different configurations, all of which are contemplated herein. The embodiments are illustrated by way of example and not limitation in the figures of the accompanying drawings, in which like references indicate similar elements and in which.

Figure 1:
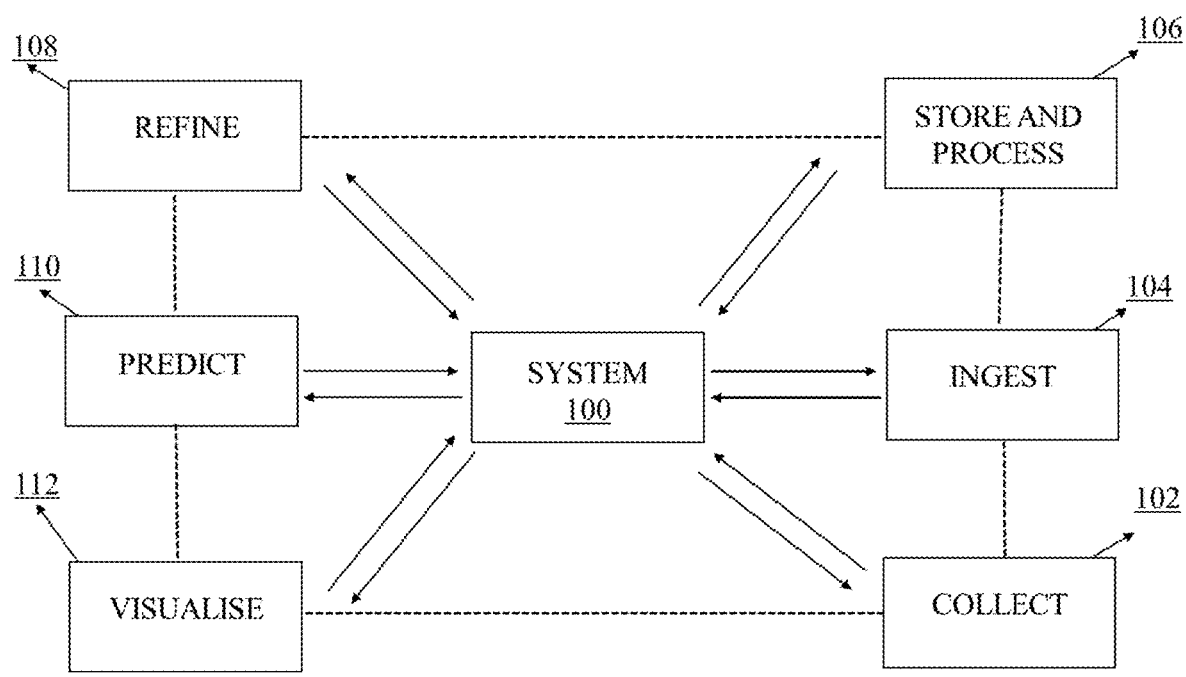
FIG. 1 illustrates input-output functionalities relationship between each subsystem of the automated system, according to one or more embodiments.

Other features of the present embodiments will be apparent from the accompanying drawings and from the detailed description that follows.

DETAILED DESCRIPTION

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing embodiments only and is not intended to be limiting. Unless defined otherwise, all technical and scientific terms used herein have the same meaning as commonly understood by one of ordinary skill in the art to which this disclosure belongs.

The articles "a" and "an" are used herein to refer to one or to more than one (i.e., to at least one) of the grammatical object of the article. By way of example, "an element" means one element or more than one element.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

In this disclosure, the terms "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term in this written description, like "comprising" or "including," it is understood that direct support should also be afforded to "consisting essentially of" language as well as "consisting of" language as if stated explicitly and vice versa.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Reference throughout this specification to "an example", "an instance", "for example" means that a particular feature, structure, or characteristic described in connection with the example is included in at least one embodiment. Thus, appearances of the phrases "in an example" in various places throughout this specification are not necessarily all referring to the same embodiment.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to a suitable receiver apparatus.

The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

A computer program (also known as a program, software, software application, app, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example without limitation, a Programmable Logic Controller (PLC), a Field Programmable Gate Array (FPGA), an Application Specific Integrated Circuit (ASIC), Application Specific Standard Product (ASSP), System On a Chip (SOC), Complex Programmable Logic Device (CPLD), etc.

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, optical disks or solid state disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., Erasable Programmable Read-Only Memory (EPROM), Electronically Erasable Programmable Read-Only Memory (EEPROM), and flash memory devices; magnetic disks, e.g., internal hard disks or removable disks; magneto optical disks; and Compact Disc Read-Only Memory (CD ROM) and Digital Versatile Disk-Read Only Memory (DVD-ROM) disks. The processor and the memory may be supplemented by, or incorporated in, special purpose logic circuitry.

To provide for interaction with a user, implementations may be realized on a computer having a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back-end component, e.g., as a data server, or that includes a middleware component, e.g., an application server, or that includes a front-end component, e.g., a client computer having a graphical user interface or a Web browser through which a user may interact with an implementation, or any appropriate combination of one or more such back end, middleware, or front-end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Even though particular combinations of features are disclosed in the specification, these combinations are not intended to limit the disclosure of possible implementations.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

An initial overview of technology embodiments is provided below, and specific technology embodiments are then described in further detail. This initial summary is intended to aid readers in understanding the technology more quickly but is not intended to identify key or essential technological features, nor is it intended to limit the scope of the claimed subject matter.

The embodiments herein and the various features and advantageous details thereof are explained more fully with reference to the non-limiting embodiments that are illustrated in the accompanying drawings and detailed in the following description.

In order to fully understand the scope of the invention, the following terms used herein are hereby defined.

As used herein, the term "SQL" stands for Structured Query Language. It is a language used in programming and designed for managing data held in a Relational Database Management System (RDBMS), or for stream processing in a Relational Data Stream Management System (RDSMS). It is particularly useful in handling structured data, i.e., data incorporating relations among entities and variables.

As used herein, the term "CSV" stands for Comma-Separated Values. CSV file is a delimited text file that uses a comma to separate values. Each line of the file is a data record. Each record consists of one or more fields, separated by commas. The use of the comma as a field separator is the source of the name for this file format. A CSV file typically stores tabular data (numbers and text) in plain text, in which case each line will have the same number of fields.

As used herein, the term "SCADA" stands for Supervisory Control And Data Acquisition. It is a control system architecture comprising computers, networked data communications and Graphical User Interfaces (GUI) for high level process supervisory management, while also comprising other peripheral devices like Programmable Logic Controllers (PLC) and discrete Proportional-Integral-Derivative (PID) controllers to interface with process plant or machinery. The use of SCADA has been considered also for management and operations of project-driven-processes in construction.

As used herein, the term "API" stands for Application Programming Interface. It is an interface that defines interactions between multiple software applications or mixed hardware-software intermediaries. It defines the kinds of calls or requests that can be made, how to make them, the data formats that should be used, the conventions to follow, etc. It can also provide extension mechanisms so that users can extend existing functionality in various ways and to varying degrees. An API can be entirely custom, specific to a component, or designed based on an industry-standard to ensure interoperability. Through information hiding, APIs enable modularity, allowing users to use the interface independently of the implementation. Web APIs are now the most common meaning of the term API. There are also APIs for programming languages, software libraries, computer operating systems, and computer hardware.

The APIs may be dynamically derived by the network. In other implementations, the APIs may be derived from API records that are stored by the network. Additionally, when new APIs are derived for a particular network service, the APIs may be recorded in case a similar network service request (e.g., from another user) is received, in which case the record may be promptly used to determine the appropriate API, or set of APIs, for the requested network service.

The API request (e.g., for a name, an ID, or another type of information in the request) may correspond to network interactions, communications, events, etc., that are to occur in order to provide the network service. The chain of network interactions, communications, events, etc., may be stored in libraries/repositories of the Software Defined Networking (SDN). APIs may be derived based on the characteristics of each of the interactions, communications, events, etc., being mapped to characteristics of APIs (also stored in libraries/repositories of the SDN architecture.

As used herein, the term "Cryptographic protocol" is also known as security protocol or encryption protocol. It is an abstract or concrete protocol that performs a security-related function and applies cryptographic methods, often as sequences of cryptographic primitives. A protocol describes how the algorithms should be used. A sufficiently detailed protocol includes details about data structures and representations, at which point it can be used to implement multiple, interoperable versions of a program.

Cryptographic protocols are widely used for secure application-level data transport. A cryptographic protocol usually incorporates at least some of these aspects: Key agreement or establishment, Entity authentication, Symmetric encryption, and message authentication material construction, Secured application-level data transport, Non-repudiation methods, Secret sharing methods, and Secure multi-party computation.

Secure Socket Layer (SSL) and Transport Layer Security (TLS), the successor to SSL, are cryptographic protocols that may be used by networking switches to secure data communications over a wireless network.

There exist a number of cryptographic protocols which are based on a matrix shared between the two nodes who execute the protocol. Although the shared matrix is typically public, both parties operate on the shared matrix with data which is private to the party that performs the computation, e.g., using secret information. Attacking such cryptographic protocols leads to lattice-based problems, e.g., an attacker is required to solve a lattice problem, such as a shortest vector lattice problem, to attack the protocol.

Cryptographic protocol establishes shared secrets such as encryption/decryption keys by exchanging public signals generated from transformations of private signals and one or more authentication factors.

As used herein, the term "TLS" stands for Transport Layer Security. These are cryptographic protocols designed to provide communications security over a computer network. Several versions of the protocols are widely used in applications such as email, instant messaging, and Voice Over Internet Protocol (VOIP), but its use as the Security layer in Hypertext Transfer Protocol Secure (HTTPS) remains the most publicly visible. The TLS protocol aims primarily to provide privacy and data integrity between two or more communicating computer applications. The TLS protocol comprises two layers: the TLS record and the TLS handshake protocols.

As used herein, the term "Unauthorized access" is when someone gains access to a website, program, server, service, or other system using someone else's account or other methods.

As used herein, the term "Logging" is the process of collecting and storing data over a period in order to analyze specific trends or record the data-based events/actions of a system, network or Information Technology (IT) environment. It enables the tracking of all interactions through which data, files or applications are stored, accessed, or modified on a storage device or application.

As used herein, the term "Intellectual Property (IP) assets" are part of the non-physical property of a business. They are legally protected, and that protection can be enforced in a court of law. IP assets can be independently identified, are transferrable, and have an economic lifespan As used herein, the term "Batch processing" is the processing of transactions in a group or batch. No user interaction is required once batch processing is underway. This differentiates batch processing from transaction processing, which involves processing transactions one at a time and requires user interaction.

As used herein, the term "Environmental engineering data" comprises data related to air, water, and soil.

As used herein, the term "Water treatment" is any process that improves the quality of water to make it appropriate for a specific end-use. The end use may be drinking, industrial water supply, irrigation, river flow maintenance, water recreation or many other uses, including being safely returned to the environment. Water treatment removes contaminants and undesirable components or reduces their concentration so that the water becomes fit for its desired end-use. This treatment is crucial to human health and allows humans to benefit from both drinking and irrigation use.

As used herein, the term "Terrain data" generally includes a series of points representing the high and low extremes in the terrain that define topographic features such as streams, levees, ridges, and other phenomena.

As used herein, the term "Geospatial data", also known as "spatial data", is used to describe data that represents features or objects on the Earth's surface. Whether it is man-made or natural, if it has to do with a specific location on the globe, it's geospatial.

As used herein, the term "Asset Data" is asset related information.

Asset data may include any hardware and/or software suitably configured to facilitate storing data relating to, for example legal documents, tracking and status data, schedules, transactions, authentication credentials, user permissions, consumer preferences, equipment data, operational data and the like.

As used herein, the term "Utility data" relates to the water and wastewater data.

As used herein, the term "Data maintenance" is the process of organizing and curating data according to industry needs. Properly maintaining and caring for data is essential to ensuring that data remains accessible and usable for its intended purposes.

As used herein, the term "External data sets" is a data source that can be queried directly even though the data is not stored in a data warehouse e.g. BigQuery®. Instead of loading or streaming the data, a table that references the external data sets is created.

As used herein, the term "Feed-forward" is an element or pathway within a control system that passes a controlling signal from a source in its external environment to a load elsewhere in its external environment. This is often a command signal from an external operator.

A control system which has only feed-forward behavior responds to its control signal in a pre-defined way without responding to how the load reacts; it is in contrast with a system that also has feedback, which adjusts the input to take account of how it affects the load, and how the load itself may vary unpredictably. The load is considered to belong to the external environment of the system.

In a feed-forward system, the control variable adjustment is not error-based. Instead, it is based on knowledge about the process in the form of a mathematical model of the process and knowledge about, or measurements of, the process disturbances.

In general, the information used for feed-forward control need not be data directly describing an event, but may be information inferred from past data, such as probabilistic predictions obtained by correlations or neural network mining of the data to suggest improvement opportunities or possible problems to be avoided or probabilities of various costs and problems to be weighed in optimizing process conditions.

As used herein, the term BigQuery® is a fully managed, serverless data warehouse that enables scalable analysis over petabytes of data. It is a Platform as a Service (PaaS) that supports querying using the American National Standards Institute (ANSI) SQL. It also has built-in machine learning capabilities.

As used herein, the term "IoT" stands for Internet of Things which describes the network of physical objects ("things") or objects that are embedded with sensors, software, and other technologies for the purpose of connecting and exchanging data with other devices and systems over the internet.

There has been a convergence of multiple technologies, real-time analytics, machine learning, commodity sensors, and embedded systems. Traditional fields of embedded systems, wireless sensor networks, control systems, automation (including process, factory, home, and building automation), and others all contribute to enabling IoT.

As used herein, the term "Predictive modelling" is a process that uses data and statistics to predict outcomes with data models. Predictive modelling can be applied to any type of unknown event, regardless of when it occurred. Predictive modeling is also often referred to as Predictive analytics.

As used herein, the term "Node.js" is an open-source, cross-platform, back-end JavaScript runtime that runs on the V8 JavaScript engine and executes JavaScript code outside a web browser. Node.js lets developers use JavaScript to write command line tools and for server-side scripting, running the scripts server-side to produce dynamic web page content before the page is sent to the user's web browser. Consequently, Node.js represents a "JavaScript everywhere" paradigm, unifying web-application development around a single programming language, rather than different languages for server-side and client-side scripts.

Though ".js" is the standard filename extension for JavaScript code, the name "Node.js" does not refer to a particular file in this context and is merely the name of the product. Node.js has an event-driven architecture capable of asynchronous input/output. These design choices aim to optimize throughput and scalability in web applications with many input/output operations, as well as for real-time Web applications (e.g., real-time communication programs and browser games).

As used herein "Machine learning" refers to algorithms that give a computer the ability to learn without being explicitly programmed including algorithms that learn from and make predictions about data. Machine learning algorithms include, but are not limited to, decision tree learning, artificial neural networks (ANN) (also referred to herein as a "neural net"), deep learning neural network, support vector machines, rule based machine learning, random forest, etc. For the purposes of clarity, algorithms such as linear regression or logistic regression can be used as part of a machine learning process. However, it is understood that using linear regression or another algorithm as part of a machine learning process is distinct from performing a statistical analysis such as regression with a spreadsheet program. The machine learning process can continually learn and adjust the classifier as new data becomes available and does not rely on explicit or rules-based programming.

Statistical modeling relies on finding relationships between variables (e.g., mathematical equations) to predict an outcome.

As used herein, the term "Data mining" is a process used to turn raw data into useful information. By using software to look for patterns in large batches of data, more effective strategies can be developed for problem solving.

Data mining may be performed, by searching for temporal changes of data and/or simply searching for data related to a particular user or piece of equipment.

Data mining is performed on a large data set associated with any number of users and their specific characteristics and performance parameters.

As used herein, the term "Data silo" is a collection of information in an organization that is isolated from and not accessible by other parts of the organization.

Different data silos within an organization may contain the same entity with data that is common across different silos as well as data that is specific to each silo. Similarly security constraints associated with the entities may be applicable across silos or be specific to the silos.

As used herein, the term "Data acquisition" is the process of sampling signals that measure real world physical conditions and converting the resulting samples into digital numeric values that can be manipulated by a computer. Data acquisition systems typically convert analog waveforms into digital values for processing. The components of data acquisition systems include sensors to convert physical parameters to electrical signals, signal conditioning circuitry to convert sensor signals into a form that can be converted to digital values, and analog-to-digital converters to convert conditioned sensor signals to digital values. Data acquisition applications are usually controlled by software programs developed using various general purpose programming languages such as Assembly, BASIC, C, C++, C#, Fortran, Java, LabVIEW, Lisp, Pascal, etc. Stand-alone data acquisition systems are often called data loggers.

As used herein, the term "Abnormal data" is test data that falls outside of what is acceptable and should be rejected by the system.

As used herein, the term "Dashboard" is a type of interface that visualizes particular Key Performance Indicators (KPIs) for a specific goal or process. It is based on data visualization and infographics, so it is linked to a database that allows constant updates. In some situations, the same term is used for progress reports.

As used herein, a "Database" is a collection of information that is organized so that it can be easily accessed, managed, and updated. Computer databases typically contain aggregations of data records or files, containing operational information relevant to the system.

As used herein, the term "Data warehouse" also known as an Enterprise Data Warehouse (EDW) is a system used for reposting and data analysis and is considered a core component of business. Data warehouses are central repositories of integrated data from one or more disparate sources. They store current and historical data in one single place that are used for creating analytical reports for workers throughout the enterprise. The data stored in the warehouse is uploaded from the operational systems. The data may pass through an operational data store and may require data cleaning for additional operations to ensure data quality before it is used in the data warehouse for reporting.

A distributed data warehouse service may provide data management services to clients.

The data warehouse subsystem also provides full data lineage tracking from source to system user use, as well as a self-service capability to define meta-data and meta-logic by system users without IT assistance. More specifically, data lineage is carried out by tracking the lineage of all data in the warehouse as it moves from the original data loaded to the warehouse through all integration, merger, aggregation, calculation, and transformation steps that can create derived data from the original and reuse derived data.

As used herein, the term "Data lake" is a system or repository of data stored in its natural/raw format, usually object blobs or files. A data lake is usually a single store of data including raw copies of source system data, sensor data, social data etc., and transformed data used for tasks such as reporting, visualization, advanced analytics and machine learning. A data lake can include structured data from relational databases (rows and columns), semi-structured data (CSV, logs, Extensible Markup Language (XML), JavaScript Object Notation (JSON)), unstructured data (emails, documents, Portable Document Format (PDF) files) and binary data (images, audios, videos). A data lake can be established "on premises" (within an organization's data centers) or "in the cloud" (using cloud services from vendors such as AMAZON™, MICROSOFT™, or GOOGLE™).

A device or software program is said to be agnostic or data agnostic if the method or format of data transmission is irrelevant to the device or program's function. This means that the device or program can receive data in multiple formats or from multiple sources, and still process that data effectively.

As used herein, the term "Environmental data" is that which is based on the measurement of environmental pressures, the state of the environment and the impacts on ecosystems. This is usually the "P", "S" and "I" of the DPSIR model where D=Drivers, P=Pressures, S=State, I=Impact, R=Response.

Environmental data is typically generated by institutions executing environmental law or doing environmental research. Environment statistics are usually generated by statistical offices and are considered as environmental data, too. Socio-economic data and other statistical data (often the "D" and the "R" of the DPSIR model) are not considered as environmental data. However, they are to be integrated into comprehensive environmental assessments. Usually, this kind of data is held by other institutions than the environmental administration (e.g., National Statistical Offices). The same is true for geo-basis data, which are not considered as environmental data, but have to be available for environmental policies and environmental information. In recent years, environmental data has become increasingly important to investors.

All data generated by the execution of environmental law are to be considered as environmental data.

As used herein, the term "Engineering data" is defined as any information that collectively becomes the knowledge on which an engineer can design and build the proposed end-product. This information comes as drawings, manufacturer's specifications, and standards. Coupled with information relating to design, procurement, fabrication, test, and inspection of an item or structure, this rounds out the information from which the engineer designs and builds.

The database can aggregate two types of data sources: private engineering data, and public engineering data. Private engineering data includes but is not limited to the area, footprint, pinouts, parametric data, component geometries, etc., associated with the devices and/or components. Public engineering data includes data similar to private engineering data, except that public engineering data is provided by one or more databases in an accessible information source.

As used herein, the term "Data set" (or "Dataset") is a collection of data. In the case of tabular data, a data set corresponds to one or more database tables, where every column of a table represents a particular variable, and each row corresponds to a given record of the data set in question. The data set lists values for each of the variables, such as height and weight of an object, for each member of the data set. Each value is known as a datum. Data sets can also consist of a collection of documents or files.

In an embodiment, the data set includes a sequentially-ordered sequence of change sets associated with the data store, wherein each change set includes zero or more entries that specify how the state of certain entities in the data store have changed since state changes represented by a previous change set in the sequence were applied to the data store. When a new change set is added to the data set, any entries in any previously-added change sets dealing with the entities identified in the new change set are removed. Consequently, the data set provides a concise and complete representation of all the state changes that have occurred to the data store since a known origin state.

As used herein, a "Sensor" is a device that measures physical input from its environment and converts it into data that can be interpreted by either a human or a machine. Most sensors are electronic (the data is converted into electronic data), but some are simpler, such as a glass thermometer, which presents visual data.

As used herein, the term "Modbus" is a data communications protocol originally published by Modicon (now Schneider Electric) in 1979 for use with its programmable logic controllers (PLC). Modbus has become a de facto standard communication protocol and is now a commonly available means of connecting industrial electronics devices. Modbus is popular in industrial environments because it is openly published and royalty-free. It was developed for industrial applications, is relatively easy to deploy and maintain compared to other standards and places few restrictions—other than the datagram (packet) size on the format of the data to be transmitted.

The Modbus protocol uses character serial communication lines, Ethernet, or Internet Protocol suite as a transport layer. Modbus supports communication to and from multiple devices connected to the same cable or Ethernet network. For example, there can be a device that measures temperature and another device to measure humidity connected to the same cable, both communicating measurements to the same computer.

The Modbus is often used to connect a plant/system supervisory computer with a remote terminal unit (RTU) in Supervisory Control and Data Acquisition (SCADA) systems.

As used herein, the term "OPC" stands for Open Platform Communications, and is a series of standards and specifications for industrial telecommunication. An industrial automation task force developed the original standard in 1996 under the name Object Linking and Embedding (OLE) for process control. OPC specifies the communication of real-time plant data between control devices from different manufacturers.

As used herein, the term "ODBC" stands for Open Database Connectivity, and is a standard application programming interface (API) for accessing Database Management Systems (DBMS). The designers of ODBC aimed to make it independent of database systems and operating systems. An application written using ODBC can be ported to other platforms, both on the client and server side, with few changes to the data access code.

ODBC accomplishes DBMS independence by using an ODBC driver as a translation layer between the application and the DBMS. The application uses ODBC functions through an ODBC driver manager with which it is linked, and the driver passes the query to the DBMS. An ODBC driver is analogous to a printer driver or other driver, providing a standard set of functions for the application to use, and implementing DBMS-specific functionality. An application that can use ODBC is referred to as "ODBC-compliant". Any ODBC-compliant application can access any DBMS for which a driver is installed. Drivers exist for all major DBMSs, many other data sources like address book systems and spreadsheets, and even for text or comma-separated values (CSV) files.

As used herein, the term "App" is a computer program that is written and designed for a specific purpose. An app is a computer program that is designed for use on a mobile digital device.

As used herein, the term "Widget" is an application, or a component of an interface, that enables a user to perform a function or access a service.

As used herein, the term "Cloud" refers to servers that are accessed over the Internet, and the software and databases that run on those servers. Cloud servers are located in data centers all over the world. By using cloud computing, users and companies don't have to manage physical servers themselves or run software applications on their own machines.

FIG. 1 is a block diagram illustrating the input-output functionalities relationship between each subsystem of the automated system 100 according to one or more embodiments, wherein the system 100 architecture explains the input-output relationship between the subsystem functionalities. The dotted line illustrates the connection to the six functions indicating the flow from collect 102 to ingest 104, ingest 104 to store and process 106, store and process 106 to refine 108, refine 108 to predict 110, and finally to visualize 112. The collect function interacts with the ingest 104, store and process 106, refine 108, predict 110, and visualize 112 functions through the system 100 and vice versa.

Figure 2:
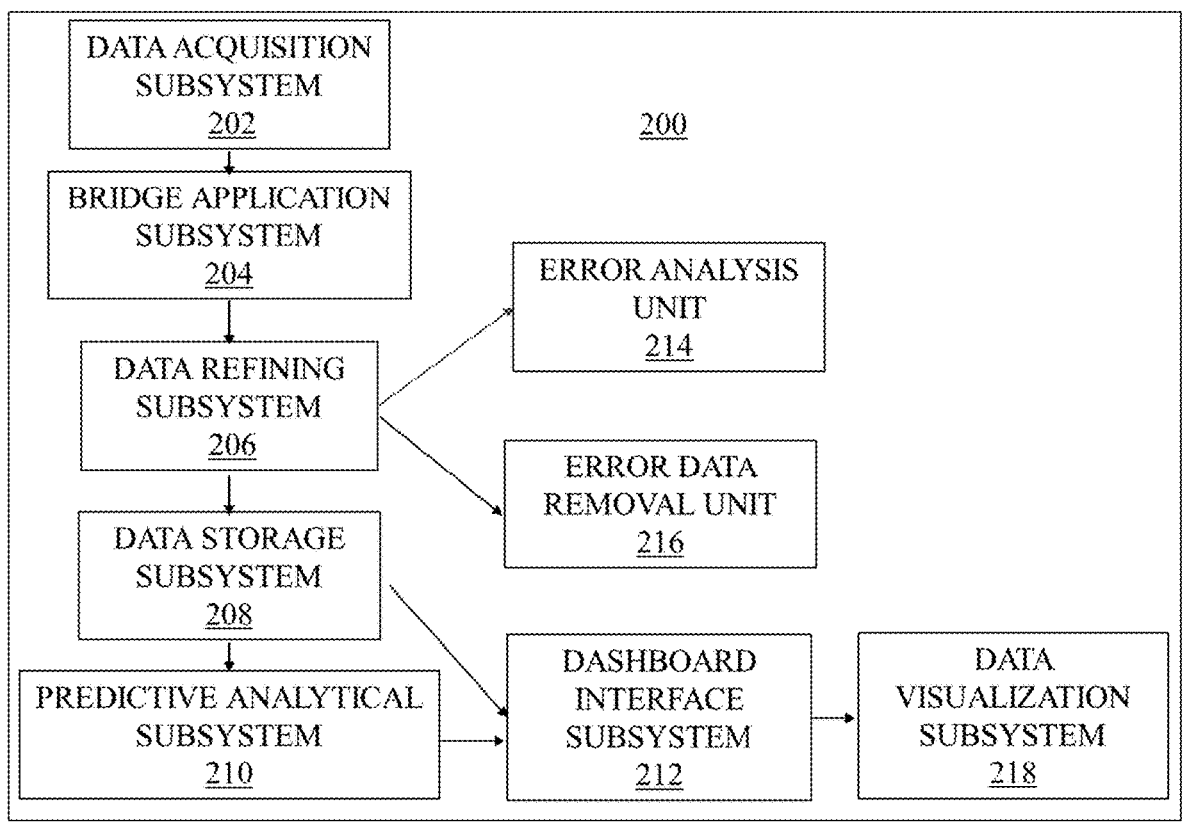
FIG. 2 illustrates a flow chart diagram showing subsystems of the system, according to one or more embodiments.

FIG. 2 illustrates a flow chart diagram showing subsystems of system 200 according to one or more embodiments. In an embodiment, a centralized data acquisition subsystem 202 is part of system 200, the data acquisition subsystem 202 receives data from one or more data sources for subsequent processing. According to the present specification, the centralized data acquisition subsystem 202 can be a SCADA server.

Further, the centralized data acquisition subsystem 202 feeds or shares the data with bridge application subsystem 204 to securely ingest data from centralized data acquisition subsystem 202 to a data storage subsystem 208.

The data storage subsystem 208 can be any of the databases or data warehouses or data lakes. The data storage subsystem 208 is attached with a data refining subsystem 206 and refines the said data acquired by data storage subsystem 208, removes abnormal data, and stores refined input data after refining. The data refining subsystem 206 comprises an error analysis unit 214 and an error data removal unit 216. The error analysis unit 214 is configured with the SCADA server and analyzes data acquired by the SCADA server, determines abnormal data, and sends an analysis result to the error data removal unit 216; and wherein the error data removal unit 216 removes the abnormal data.

The data storage subsystem 208 communicates with predictive analytical subsystem 210 and is configured to generate output data using input data from the data storage subsystem 208 for processing and computing the input data to create predictive analysis. The predictive analytical subsystem 210 enables analytics by way of various methods such as, but not limited to, data visualization, machine learning, data mining, and statistical analysis tools that analyze current and historical facts to make predictions of any one of the futures and otherwise unknown events. The predictive analytical subsystem 210 provides the intelligence that constantly improves and enhances a system and various other algorithms that generate intelligence and insight.

Further, a dashboard interface subsystem 212 is adapted for automated access of the stored data, analysis, generation of metrics, and analytics report based on the data of the predictive analytical subsystem 210. The dashboard interface subsystem 212 presents the output data in an easy to read view. A data visualization subsystem 218 is configured to generate a visual representation of data which comprises one or more of graphs, charts, tables, and reports.

Figure 3:
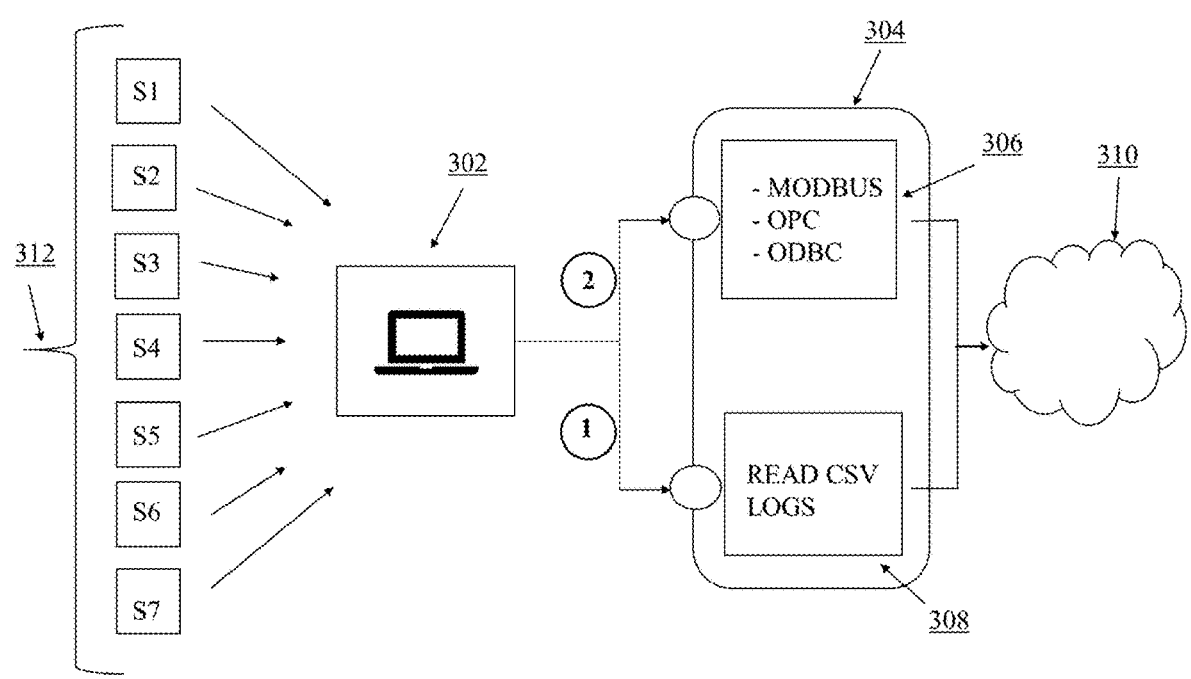
FIG. 3 illustrates a system for ingestion of data from the SCADA server to the cloud-based data storage subsystem, according to one or more embodiments.

FIG. 3 illustrates a system for the ingestion of data from the SCADA server 302 which collects data from different sources 312 to the cloud-based data storage subsystem 310 by different methods (method 1 and method 2).

Method 1 involves a scheduled SQL Query from the SCADA software database that collects the latest values from selected data points. At 308, the produced CSV file has a current timestamp and current values. The external custom bridge program present in the bridge application subsystem 304 watches CSV file(s) for modification and processes the new entries as they occur. The program reads the CSV file and transmits the values to the data storage subsystem 310 using the vendor-provided client library. Logging is added to determine the cause of any errors or exceptions, and archives of the CSV reports are kept for later reference. This method runs on a schedule and is used for batch processing. This method is cloud vendor independent.

Method 2 involves collection of data from SCADA server. At 306, the bridge application subsystem reads data from the SCADA server and transmits data into the data storage subsystem 310. The bridge application subsystem 304 comprises a custom bridge program; wherein the custom bridge program comprises connectivity protocols; and the connectivity protocols comprise such as but not limited to SCADA software's native Modbus, Open Platform Communications (OPC), and Open Database Connectivity (ODBC) drivers to read data from the SCADA server 302. This method is an instantaneous process and is event-driven.

Figure 4:
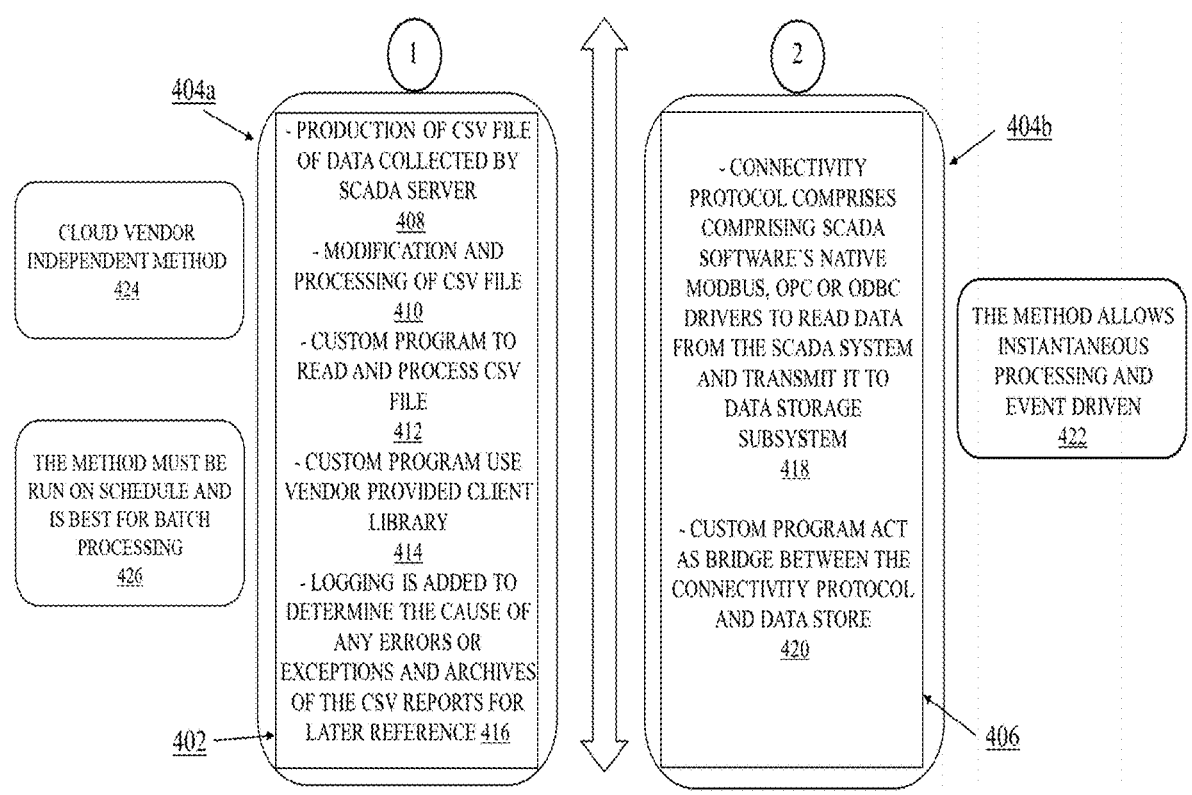
FIG. 4 illustrates the differences between two methods of ingestion of data across the bridge application subsystem, according to one or more embodiments.

FIG. 4 illustrates the differences between two methods (1 and 2) of ingestion of data across the bridge application subsystem 404*a* and 404*b*.

Method 1 at 408 involves the collection of the latest values from selected data points by a scheduled SQL Query from the SCADA server. The produced CSV file has a current timestamp and current values. At 410 and 412, the external custom bridge program 402 present in the bridge application subsystem 404*a* watches CSV file(s) for modification and processes the new entries as they occur. At 414, the program reads the CSV file and transmits the values to the data storage subsystem using a vendor-provided client library. At 416, logging is added to determine the cause of any errors or exceptions, and archives of the CSV reports are kept for later reference. At 426, method 1 runs on a schedule and is used for batch processing. Further, at 424, the method is cloud vendor independent.

Method 2 involves the bridge application 404*b* which uses the SCADA software's native Modbus, OPC, or ODBC drivers to read data from the SCADA server 302 of FIG. 3 at 418 and transmit it to the data storage subsystem 208 of FIG. 2. At 420, the external custom program 406 in the bridge application 404*b* acts as a bridge between the connectivity protocol and data storage subsystem. At 422, this method 2 allows instantaneous processing and is event-driven.

Figure 5:
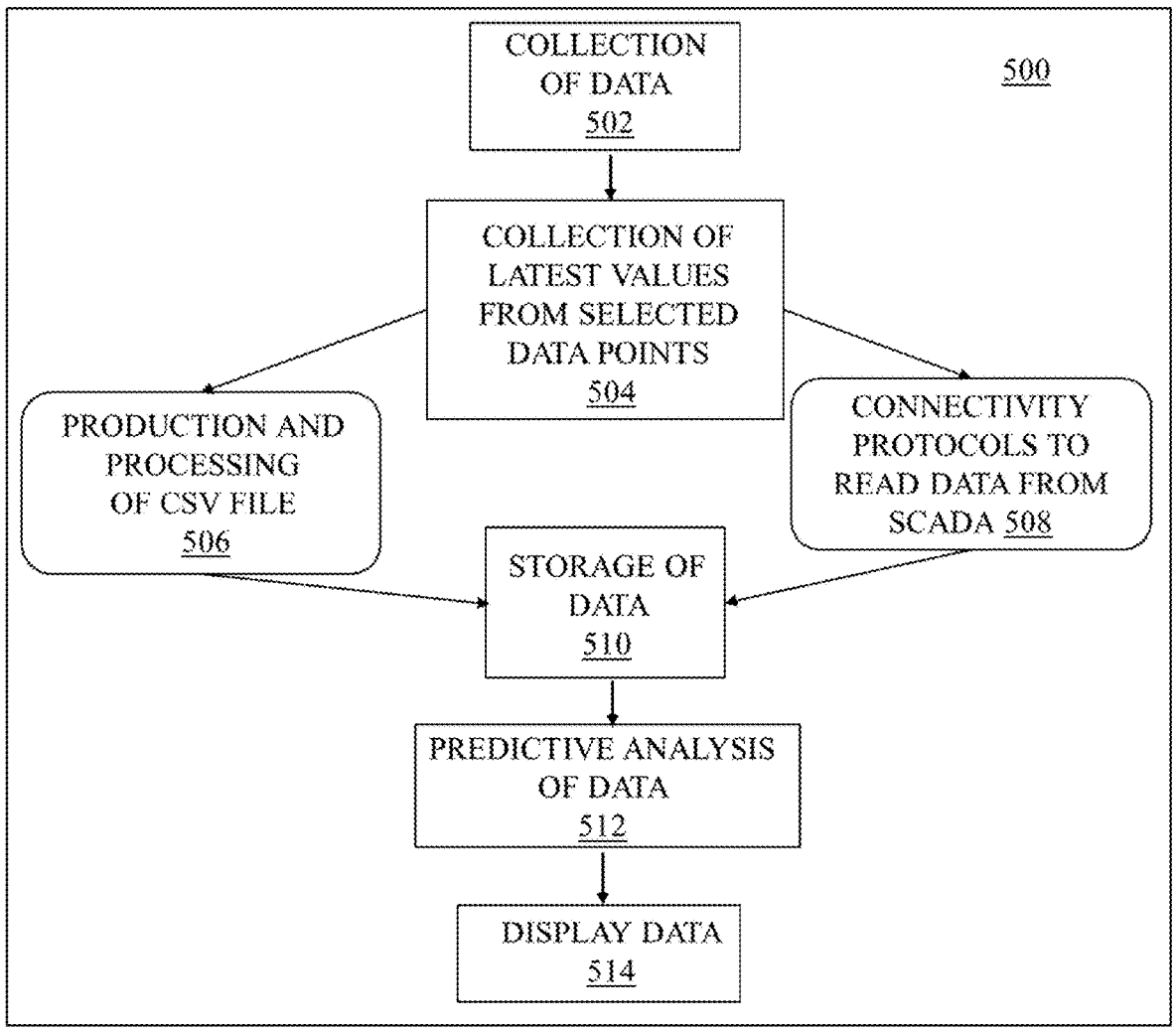
FIG. 5 illustrates a method for securely collecting, analyzing, predicting, and reporting data by subsystems present in the system, according to one or more embodiments.
Figure 6:
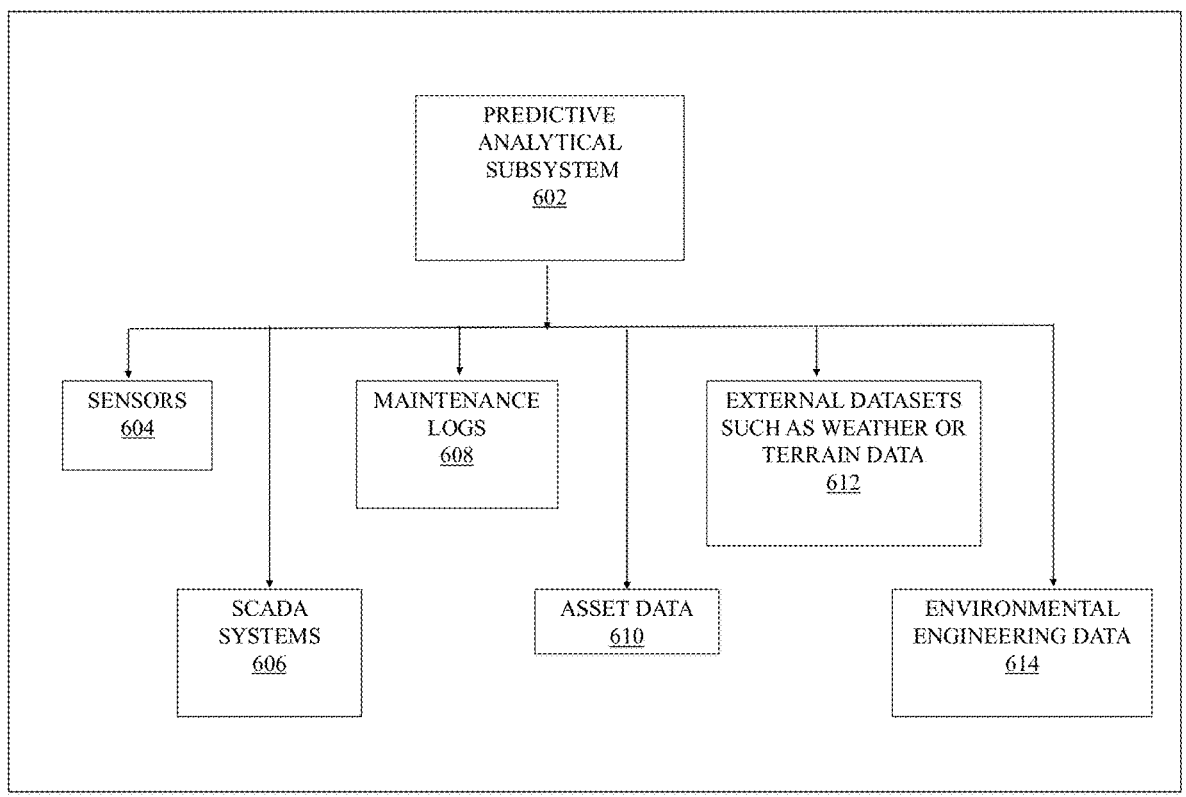
FIG. 6 illustrates working of a server, according to one or more embodiments.

FIG. 5 illustrates a method for securely collecting, analyzing, predicting, and reporting data by subsystems present in the system according to an embodiment. Method 500 includes the collection of data by SCADA server 302 of FIG. 3 from different sources at 502. Sources may comprise but are not limited to terrain data, or geospatial data, or maintenance data, or asset data, or environmental engineering data, or other external sources. Method 500 includes the collection of the latest values from selected data by the bridge application subsystem 204 of FIG. 2. The external custom bridge program present in the bridge application subsystem 204 of FIG. 2 watches CSV file(s) at 506 for modification and processes new entries as they occur. The program reads the CSV file and transmits the values to the data storage subsystem 208 of FIG. 2 using a vendor-provided client library. Further, logging is added to determine the cause of any errors or exceptions, and the CSV reports are archived for future reference. Method 504 is good for batch processing and runs on a schedule. This method is cloud vendor agnostic. In another case, method 500 includes the collection of data by SCADA server. Further, the bridge application subsystem 204 of FIG. 2 reads data from the SCADA server 302 of FIG. 3 and transmits data into the data storage subsystem 208 of FIG. 2. At 506, the bridge application subsystem 204 of FIG. 2 comprises a custom bridge program; wherein the custom bridge program comprises connectivity protocols; and the connectivity protocols comprise any one of the SCADA software's native Modbus, Open Platform Communications (OPC), and Open Database Connectivity (ODBC) drivers to read data from the SCADA server 302 of FIG. 3. This method involving 506 is an instantaneous process and is event-driven. At 508, data acquired by the bridge application subsystem 204 of FIG. 2 is stored in the data storage subsystem 208 of FIG. 2. At 510, the predictive analytical subsystem 210 and/or 602 of FIG. 2 and FIG. 6 generate output data using input data from the data storage subsystem 208 of FIG. 2 for processing and computing the input data to create predictive analysis. Predictive analytical subsystem 210 and/or 602 of FIG. 2 and FIG. 6 enable analytics by way of various methods such as, but not limited to, data visualization, machine learning, data mining, and statistical analysis tools that analyzes current and historical facts to make predictions of any one of the futures and otherwise unknown events. The predictive analytical subsystem 210 and/or 602 of FIG. 2 and FIG. 6 provides the intelligence that constantly improves and enhances a system and various other algorithms that generate intelligence and insight. Further, at 512, data from predictive analytical subsystem 210 and/or 602 of FIG. 2 and FIG. 6 is analyzed and metrics are generated using a dashboard interface subsystem 212 of FIG. 2. In addition, visualization subsystem 218 of FIG. 2 is present in an automated system for visualizing the final reports.

FIG. 6 illustrates the different data sources which are analyzed by predictive analytical subsystem 602 to get predictions regarding a system. Data sources may include data from but not limited to sensors 604, SCADA systems 606, asset data 610, maintenance data 608, environmental engineering data 614, and external data sets 612. The external data sets 612 can be of weather and terrain data.

Figure 7:
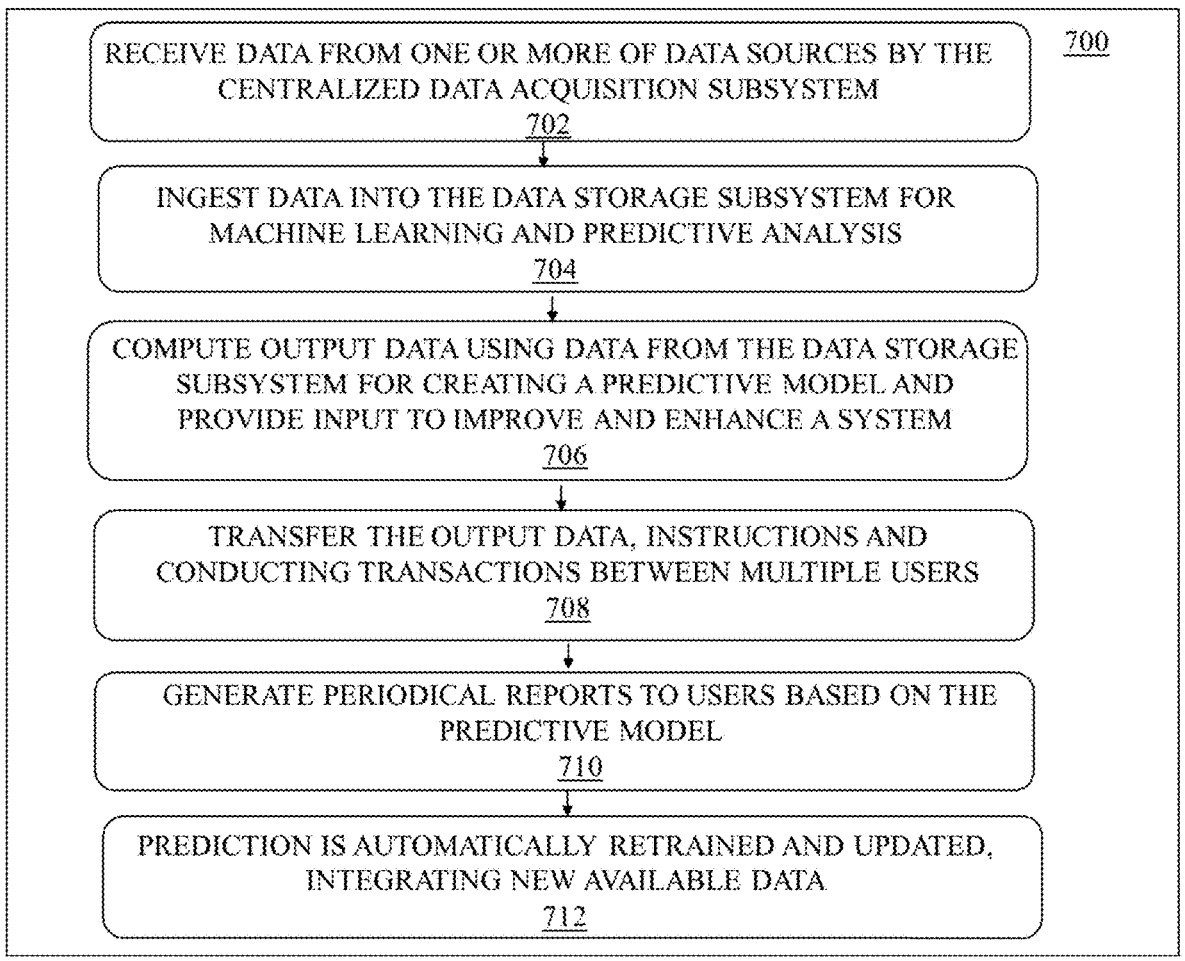
FIG. 7 illustrates a method for creating a predictive model of a system, according to one or more embodiments.

FIG. 7 illustrates a method for creating a predictive model of a system. Method 700 is performed by the predictive analytical subsystem such as 210, and/or 602 of FIG. 2 and FIG. 6. The method includes receiving data 702 from one or more data sources by the centralized data acquisition subsystem 202 of FIG. 2. Method 700 includes ingesting data at 704 into the data storage subsystem 208 of FIG. 2 for machine learning and predictive analysis. Method 700 includes computing output data at 706 using data from the data storage subsystem 208 of FIG. 2 for creating a predictive model and providing input to improve and enhance a system. The method includes transferring the output data at 708, instructions, and conducting transactions between multiple users. Method 700 at 710 includes the generation of periodical reports to users based on the predictive model. Finally, at 712 prediction is automatically retrained and updated, integrating newly available data.

Figure 8:
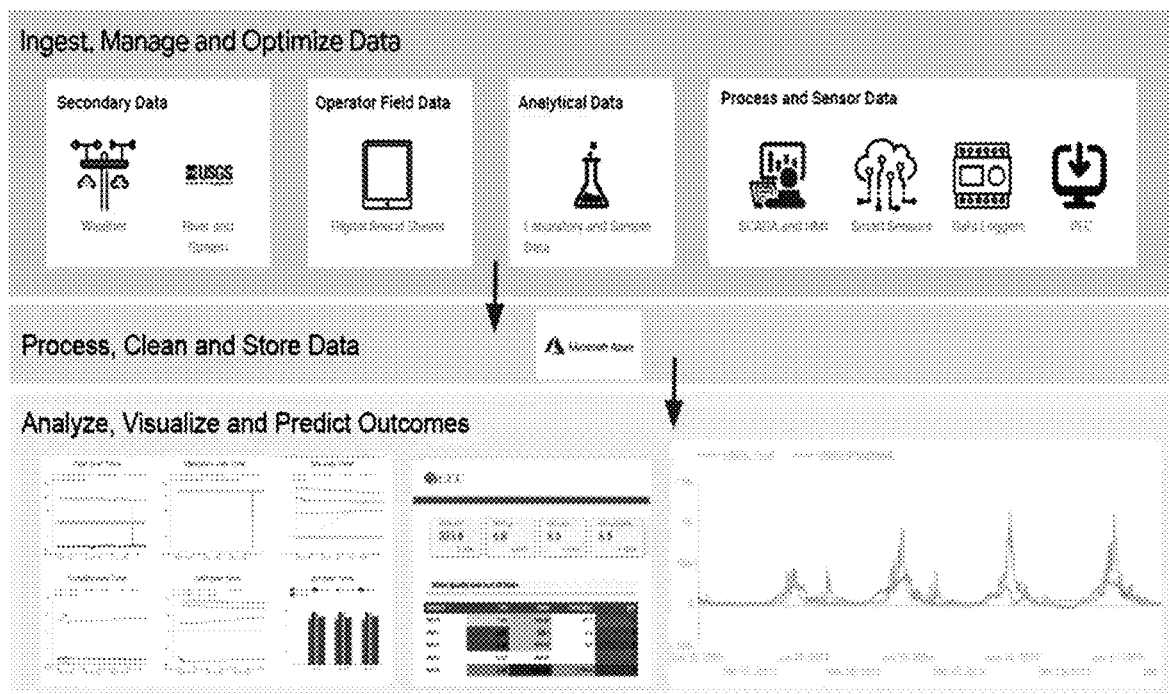
FIG. 8 illustrates remediation site digital transformation, according to one or more embodiments.

FIG. 8 illustrates remediation site digital transformation. In an embodiment, the system collects historically unused environmental data, from environmental remediation sites and verifies the data sources after which it refines and optimizes them and then ingests them into cloud data storage. Further, it performs data cleansing and validation. Afterward, the analytics system applies machine learning models to form trend predictions and presents both historical data and predictions in an intuitive web-based dashboard. Environmental remediation is defined as the cleanup of contaminated soil, groundwater, or air performed at a specific site.

Figure 9:
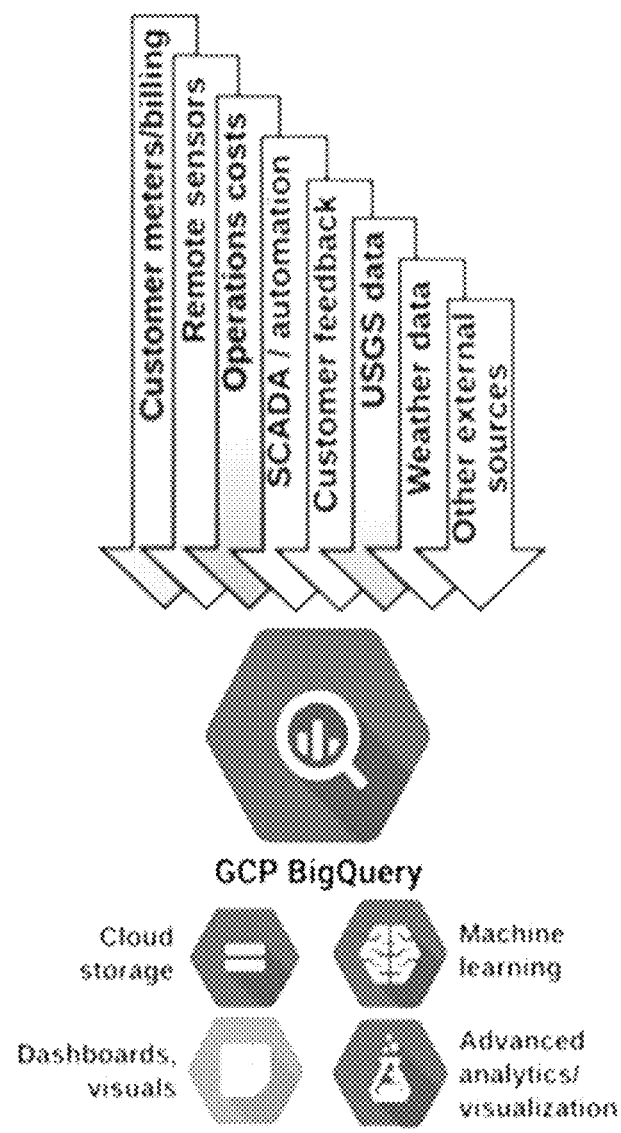
FIG. 9 illustrates an overview of a system, according to one or more embodiments.

FIG. 9 illustrates an overview of the system. The Analytics comprises various data sources, cloud storage to store data, machine learning to form trend predictions, and presents both historical data, and predictions in a dashboard interface. The data sources comprise but are not limited to customer meters or billing, remote sensors, operations cost, SCADA or automation, customer feedback, United States Geological Survey (USGS) data, weather data, and other external sources.

Figure 10:
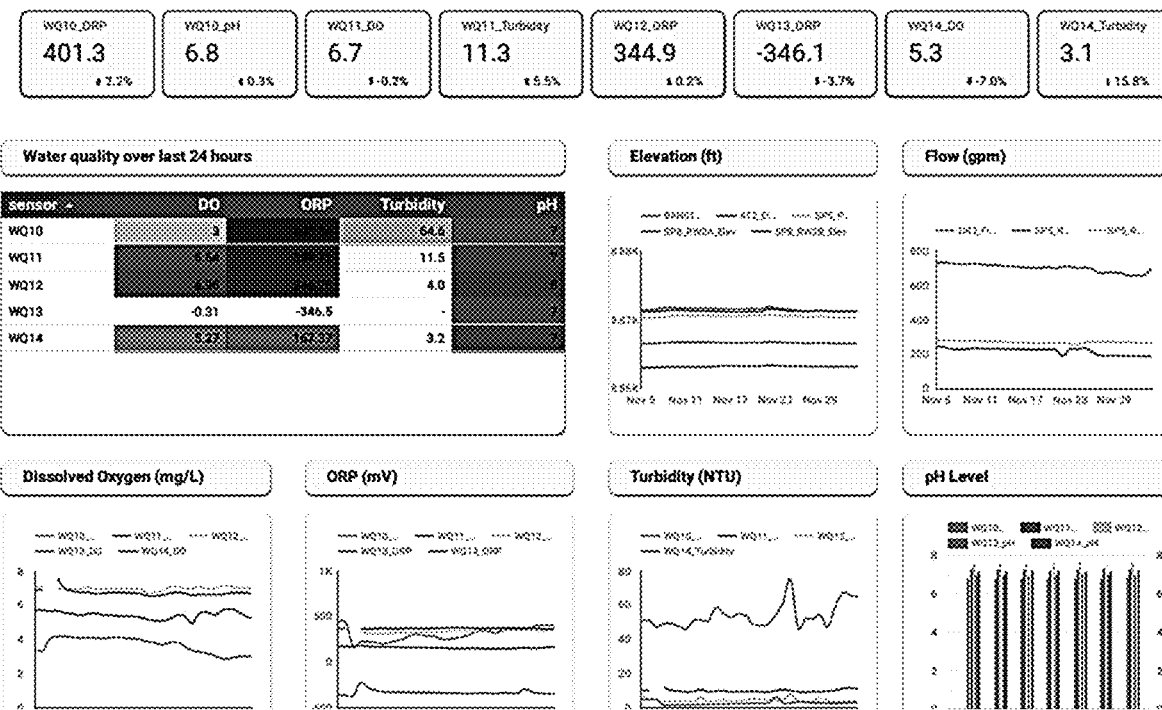
FIG. 10 illustrates a smart water data analytics dashboard to visualize various statistics, according to one or more embodiments.

FIG. 10 illustrates a smart water data analytics dashboard interface to visualize various statistics according to one or more embodiments. The dashboard interface developed for smart water data analytics uses API libraries, frameworks, and cloud services to quickly pull and display the metrics stored in the data storage subsystem. FIG. 10 illustrates various graphs and tables related to water quality parameters such as pH, turbidity, dissolved oxygen (DO), oxygen reduction potential (ORP), water flow rate, etc. All the data displayed on the dashboard interface remains up to date according to the most recent data uploaded to the tables. The dashboard interface presents the data in an easy-to-read view. Widgets at the top of the page represent data averages over the last 24 hours, with the percent increase or decrease over the last 48 hours displayed in the corner of each widget. A heat map is also utilized to display data trends at individual locations for a simple view of ascending or descending values.

Figure 11:
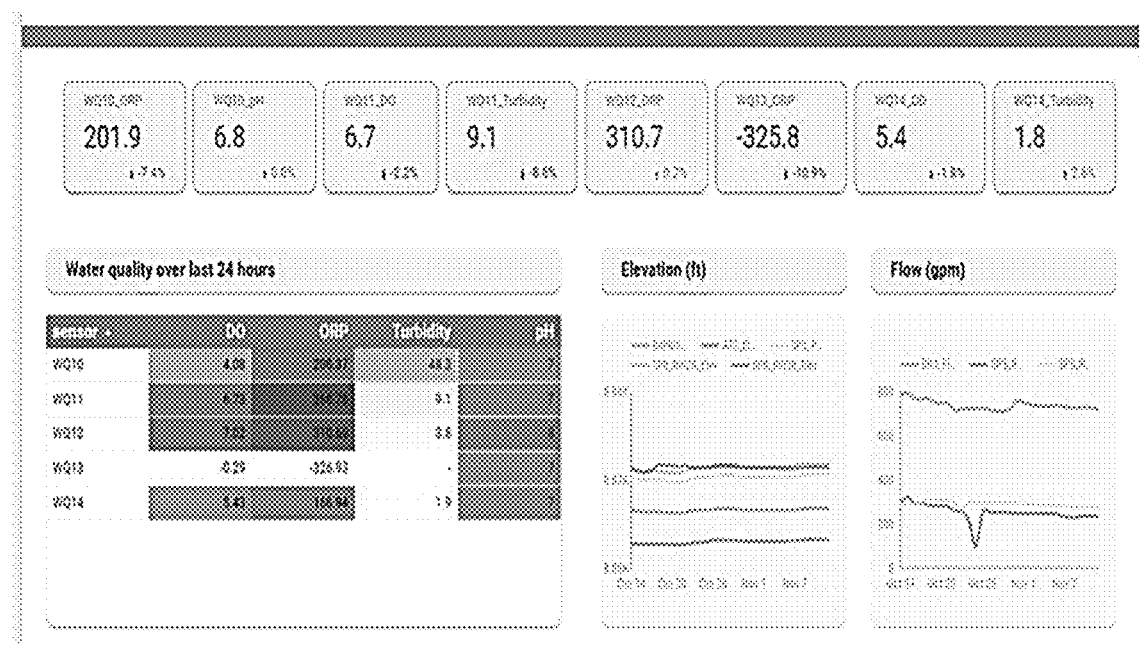
FIG. 11 illustrates a smart water data analytics dashboard landing page, according to one or more embodiments.

FIG. 11 is illustrating a smart water data analytics dashboard interface landing page. The dashboard interface developed for smart water data analytics uses API libraries, frameworks, and cloud services to quickly pull and display the metrics stored in the data storage subsystem. FIG. 11 illustrates various graphs and tables related to water quality parameters such as pH, turbidity, dissolved oxygen (DO), oxygen reduction potential (ORP), water flow rate, etc. All the data displayed on the dashboard interface remains up to date according to the most recent data uploaded to the tables. The dashboard interface presents the data in an easy-to-read view. Widgets at the top of the page represent data averages over the last 24 hours, with the percent increase or decrease over the last 48 hours displayed in the corner of each widget. A heat map is also utilized to display data trends at individual locations for a simple view of ascending and descending values. The landing page serves as an overview of current data stored, giving the user a concise view of the data.

Figure 12:
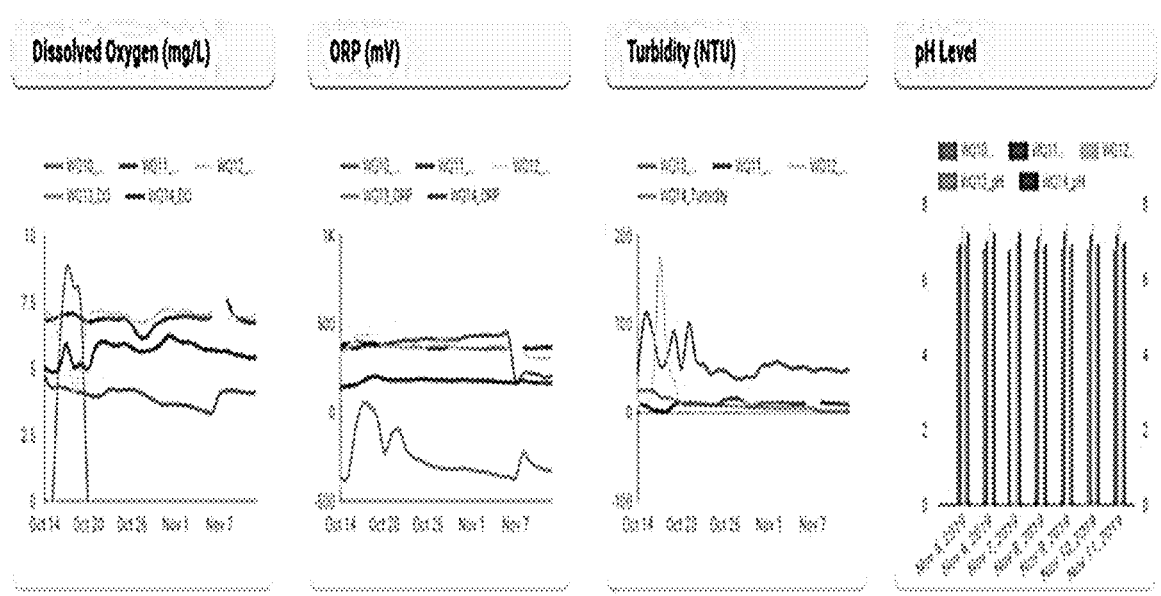
FIG. 12 illustrates a smart water data analytics dashboard visualization according to one or more embodiments.

FIG. 12 illustrates dashboard interface visualizations for smart water data analytics according to one or more embodiments. The dashboard interface developed for smart water data analytics uses API libraries, frameworks, and cloud services to quickly pull and display the metrics stored in the data storage subsystem. FIG. 12 illustrates various graphs related to water quality parameters such as pH, turbidity, dissolved oxygen (DO), and oxygen reduction potential (ORP). All the data displayed on the dashboard interface remains up to date according to the most recent data uploaded to the tables.

Figure 13:
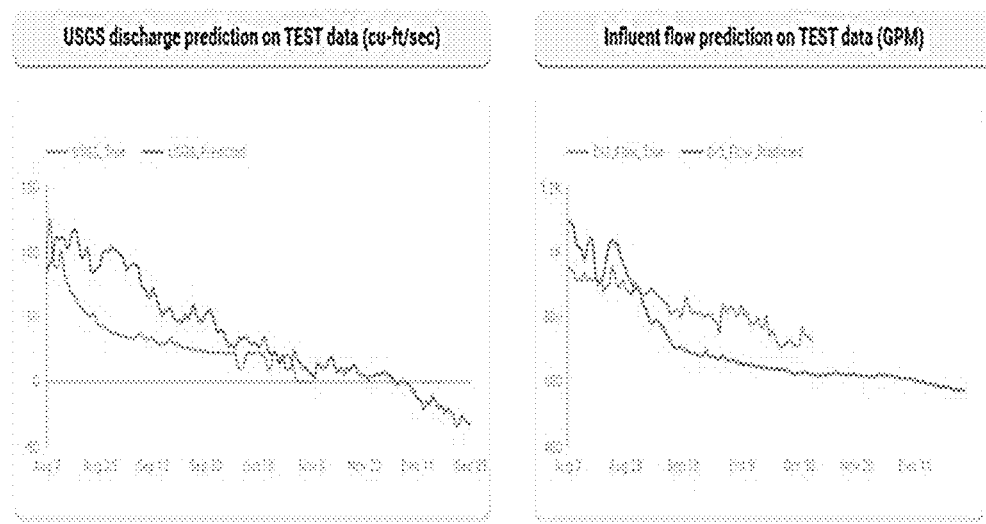
FIG. 13 illustrates dashboard visualizations related to prediction, according to one or more embodiments.

FIG. 13 illustrates prediction dashboard visualizations according to an embodiment. FIG. 13 illustrates the graphs related to The United States Geological Survey (USGS) discharge prediction on TEST data in cu-ft/sec and influent flow prediction on TEST data in Gallons per Minute (GPM).

Smart water data analytics performs predictive analytics and modeling on utility data using a predictive analytical subsystem that comprises but is not limited to TensorFlow and Google Cloud machine learning tools. One specific data prediction displayed in the dashboard is for the system influent flow rate. Influent flow rate is predicted using data from USGS, Snow Telemetry (SNOTEL) weather sites, and local SCADA data. Temperature, precipitation, snowpack, river flow rate, and system flow rate are all used to build the predictive model. The stored data in the data storage subsystem is correlated and aggregated before the analysis is performed. The data is then pulled into a cloud data lab for machine learning and predictive analysis. The prediction is automatically retrained, updated, and integrates newly available data.

Figure 14:
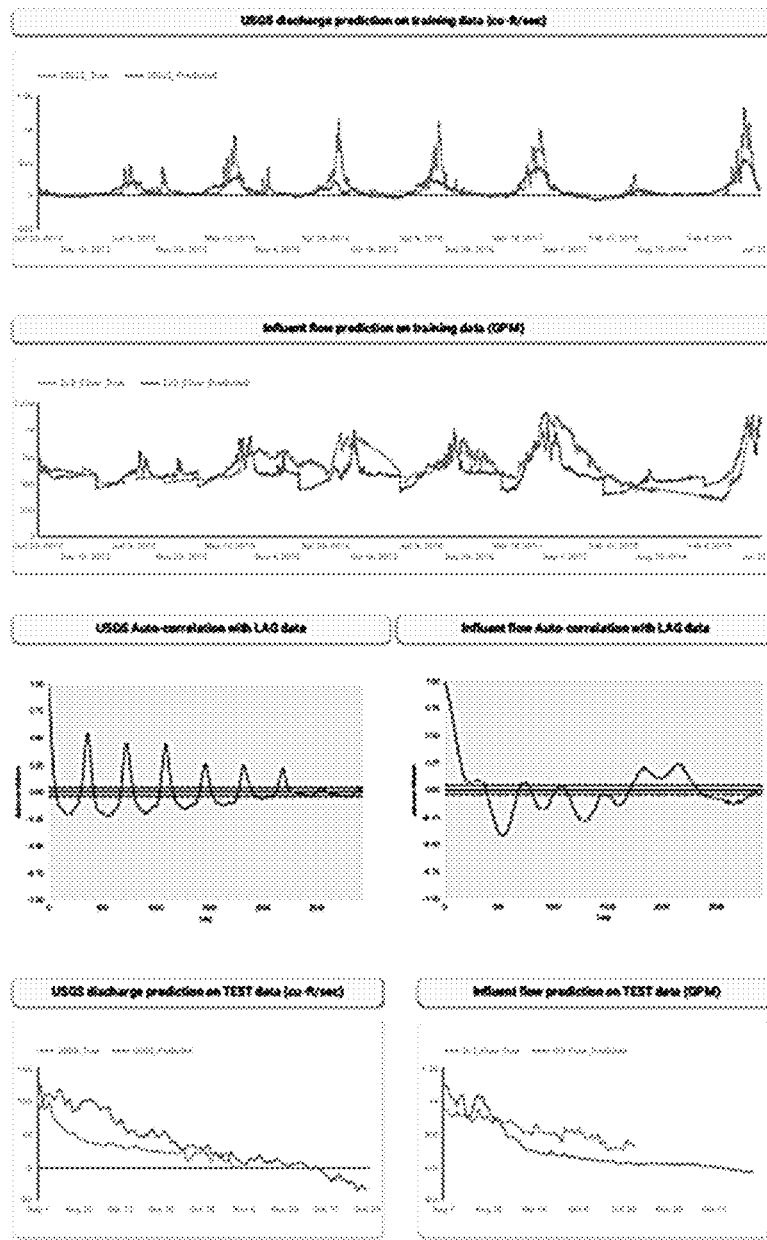
FIG. 14 illustrates dashboard visualizations related to prediction, according to one or more embodiments.

FIG. 14 illustrates dashboard visualizations related to prediction according to one or more embodiments. FIG. 14 illustrates the graphs related to the USGS data prediction on TEST data in cu-ft/sec and influent flow prediction on TEST data in Gallons per Minute (GPM).

Smart water data analytics performs predictive analytics and modeling on utility data using machine learning tools e.g. TensorFlow and Google Cloud. One specific data prediction displayed in the dashboard is for the system influent flow rate. Influent flow rate is predicted using data from USGS, SNOTEL weather sites, and local SCADA data. Temperature, precipitation, snowpack, river flow rate, and system flow rate are all used to build the predictive model. The stored data in the data warehouse e.g. BigQuery® is correlated and aggregated before the descriptive analysis is performed. The data is then pulled into a cloud data lab for machine learning and predictive analysis. The prediction is automatically retrained, updated, and integrates newly available data.

Figure 15:
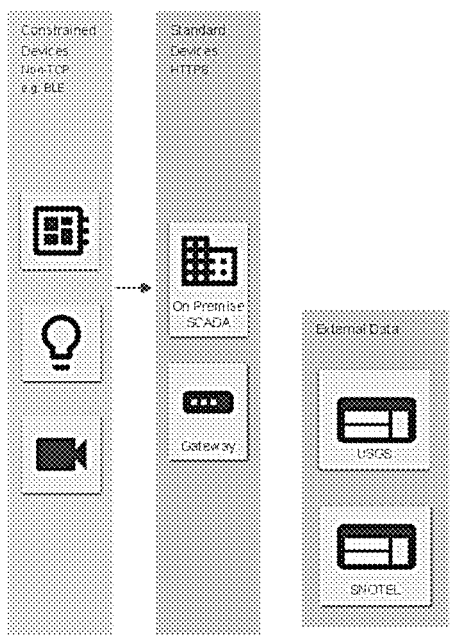
FIG. 15 illustrates a schematic diagram of different internal and external data sources, according to one or more embodiments.

FIG. 15 illustrates a schematic diagram of different internal and external data sources according to an embodiment. FIG. 15 illustrates data sources such as USGS, SNOTEL weather sites, and local SCADA server. These external and internal data sources provide a comprehensive view of processes and factors impacting operations.

After determining the method of collection for internal and external data, the system utilizes machine learning to create predictions for future trends. Current data, historical data, and data predictions are presented to users through an intuitive and easy-to-navigate dashboard created with a data visualization subsystem e.g. Data Studio. The dashboard provides graphs and tables of the data, and it can be used to generate automated reports for stakeholders. Data can also be downloaded directly from the dashboard for further analysis.

Figure 16:
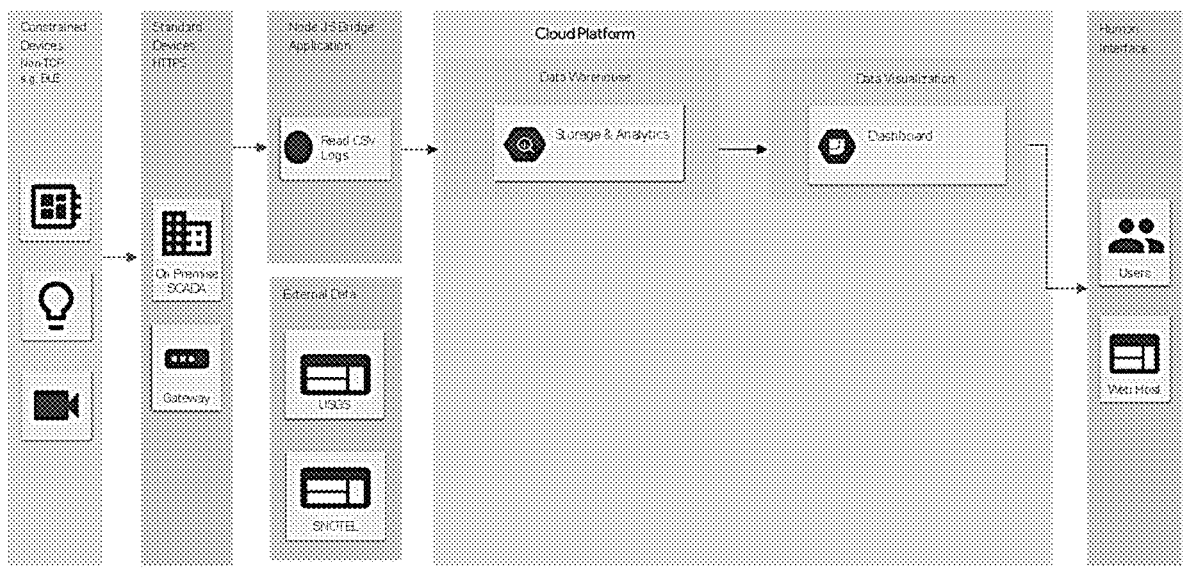
FIG. 16 illustrates a schematic diagram of architecture showing data collection from on premise Internet of Things (IoT) devices, data from SCADA server with bridge application using Node.js library and from external sources, according to one or more embodiments.

FIG. 16 illustrates a schematic diagram of architecture showing data collection from on premise IoT devices, data from SCADA server with bridge application using Node.js library and from external sources. This data will be further processed, refined, structured, and stored in a cloud database or data warehouse. There is a web application for building analytics reports and a dashboard for presenting a visual description.

Figure 17:
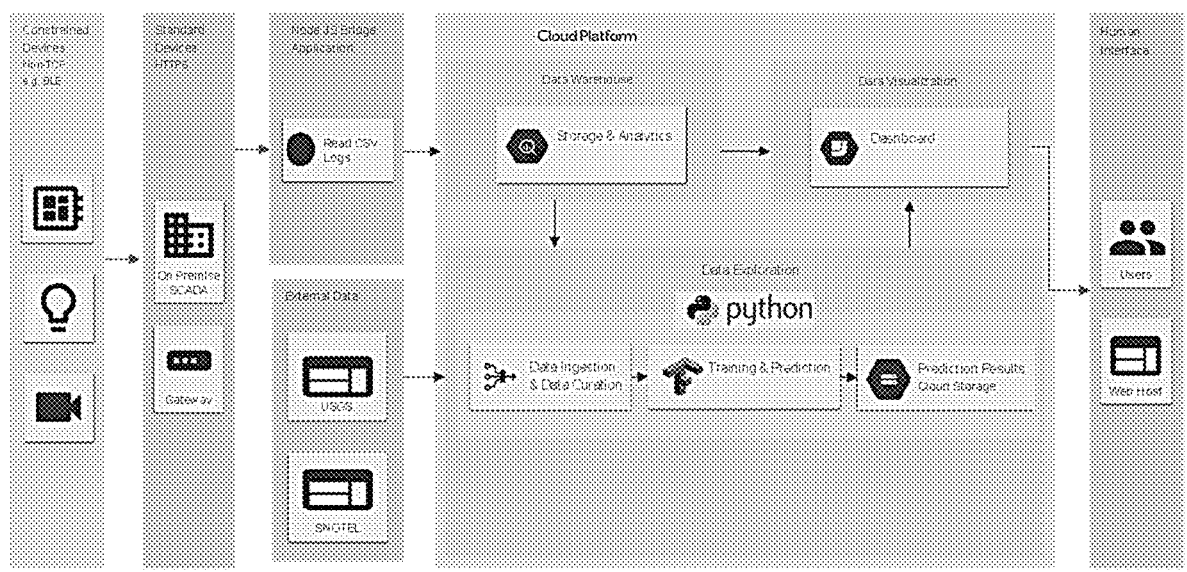
FIG. 17 illustrates a schematic diagram of the system showing data collection from on premise IoT devices, data from SCADA server with bridge application using Node.js library and from external sources, according to one or more embodiments.

FIG. 17 illustrates a schematic diagram of the system showing data collection from on premise IoT devices, data from SCADA server with bridge application using Node.js library, and from external sources. This data will be further processed, refined, structured, and stored in a cloud database or data warehouse. There is a web application for building analytics reports and a dashboard for presenting a visual description.

Further, FIG. 17 illustrates smart water data analytics which performs predictive analytics and modeling on utility data using machine learning tools e.g. TensorFlow and Google Cloud. The data is predicted using data from USGS, SNOTEL weather sites, and local SCADA data. Temperature, precipitation, snowpack, river flow rate, and system flow rate are all used to build the predictive model. The stored data in the data warehouse e.g. BigQuery® is correlated and aggregated before the descriptive analysis is performed. The data is then pulled into an interactive tool for exploring, analyzing, transforming, and visualizing data and building machine learning models e.g., Cloud DataLab. The data is displayed in a data visualization subsystem e.g. Data Studio with trends. The prediction modelling is automatically retrained, updated, and integrates newly available data.

Figure 18:
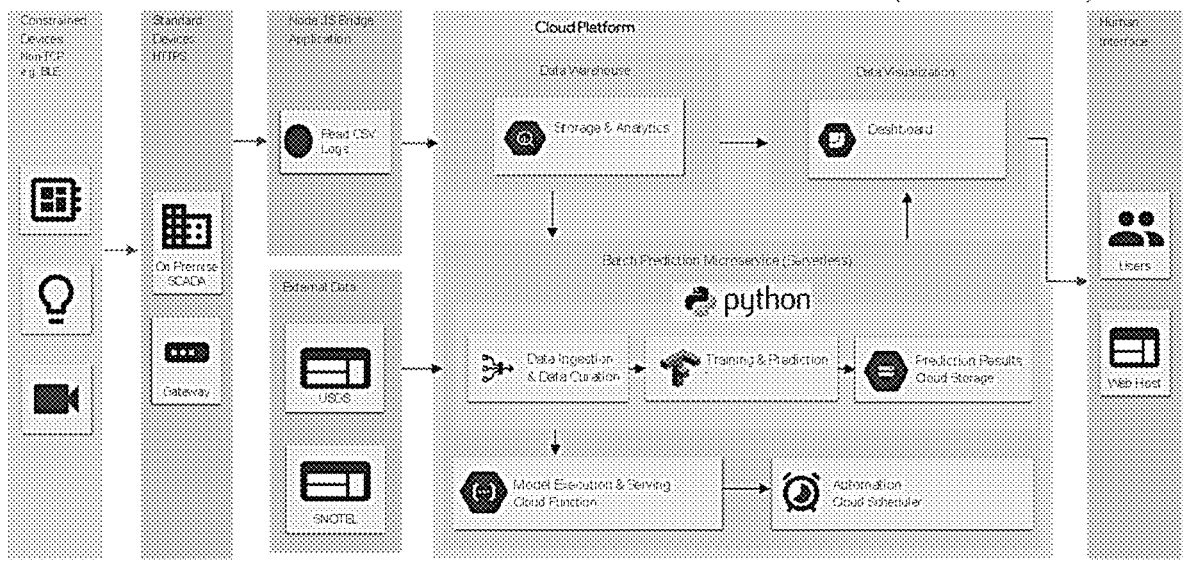
FIG. 18 illustrates an overall view of an automated system using a cloud platform, according to one or more embodiments.

FIG. 18 illustrates an overall view of smart water analytics with the cloud. FIG. 18 shows data collection from on premise IoT devices, data from SCADA server with bridge application using Node.js library, and from external sources. This data will be further processed, refined, structured, and stored in a cloud database or data warehouse. The stored data will be further consumed for analytics as well as applying machine learning models for predicting trends. There is a web application for building analytics reports and a dashboard for presenting a visual description.

Further, FIG. 18 illustrates smart water data analytics which performs predictive analytics and modeling on utility data using machine learning tools e.g. TensorFlow and Google Cloud. Future events are predicted using data from USGS, SNOTEL weather sites, and local SCADA data. Temperature, precipitation, snowpack, river flow rate, and system flow rate are all used to build the predictive model. The stored data in the data warehouse e.g. BigQuery® is correlated and aggregated before the descriptive analysis is performed. The data is then pulled into an interactive tool for exploring, analyzing, transforming, and visualizing data and building machine learning models e.g., Cloud DataLab. The data is displayed in a data visualization subsystem e.g. Data Studio with trends. The prediction modelling is automatically retrained, updated, and integrates newly available data.

Figure 19:
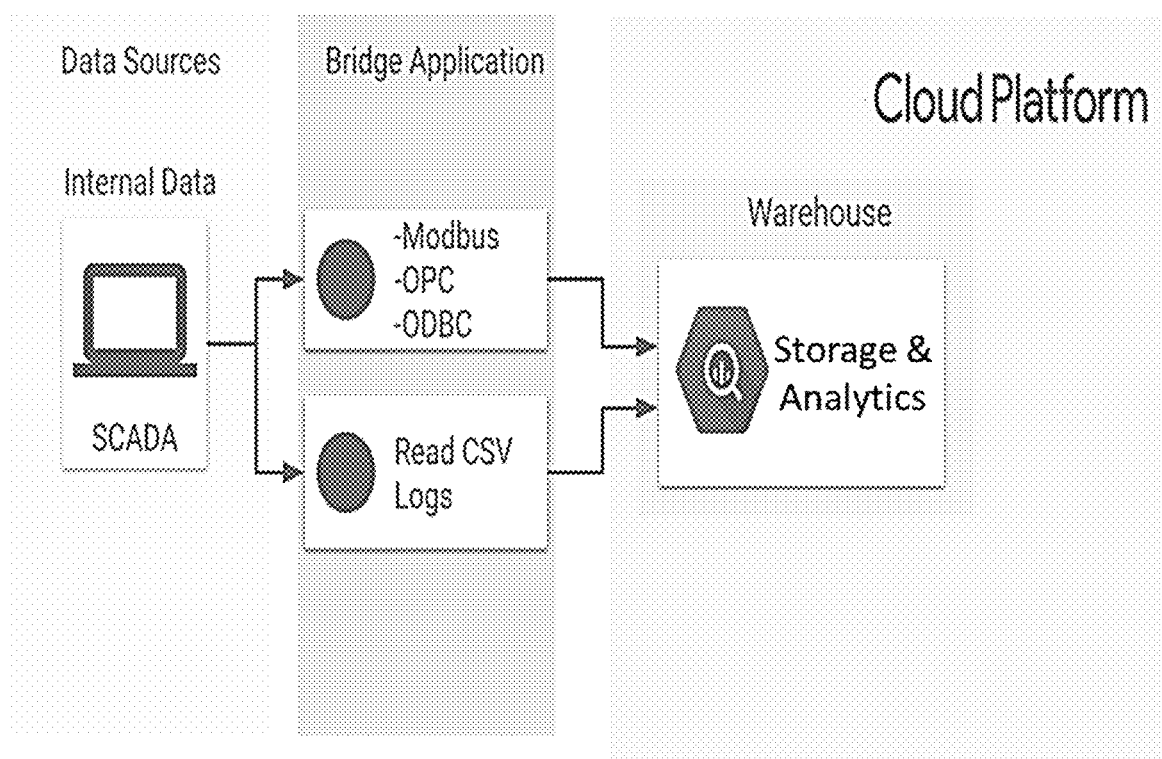
FIG. 19 illustrates an architecture for SCADA ingestion solutions (method 1 and method 2) and showing data flow from SCADA server to a data warehouse e.g. BigQuery® according to one or more embodiments.

FIG. 19 illustrates an architecture for SCADA ingestion solutions (method 1 and method 2) and shows data flow from SCADA server to the data warehouse e.g. BigQuery® according to one or more embodiments.

One method illustrates that a scheduled SQL Query from the SCADA software database collects the latest values from selected data points. The produced CSV file has a current timestamp and current values. The external custom bridge program watches CSV file(s) for modification. The program reads the CSV file and transmits the values to a data warehouse e.g. BigQuery® table using the BigQuery® NodeJS client library. Logging is added to determine the cause of any errors or exceptions, and archives of the CSV reports are kept for later reference. This solution must be run on a schedule and is best for batch processing.

The second method uses the SCADA software's native Modbus, OPC, or ODBC drivers to read data from the SCADA system and transmit it to the data warehouse e.g. BigQuery®. The external custom program acts as a bridge between the connectivity protocol and the data warehouse e.g. BigQuery®. This method allows instantaneous processing and is event-driven.

Figure 20:
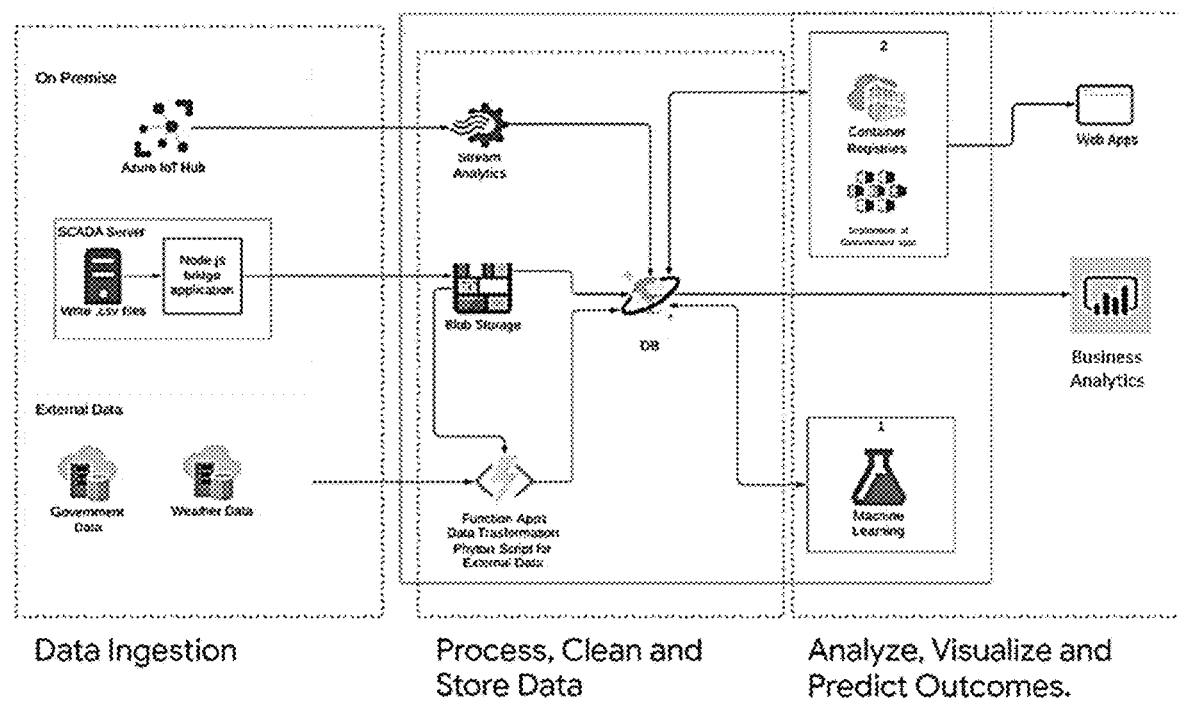
FIG. 20 illustrates a cloud system architecture according to one or more embodiments.

FIG. 20 illustrates a cloud system architecture according to one or more embodiments. It shows secure ingestion of data to cloud databases. Data is collected from on premise IoT devices, data from SCADA server with bridge application using Node.js library, and from external sources. This data will be further processed, refined, structured, and stored in a cloud database or data warehouse. The stored data will be further consumed for analytics as well as applying machine learning models for predicting trends. There is a web application for building analytics reports and a dashboard interface for presenting a visual description.

Figure 21:
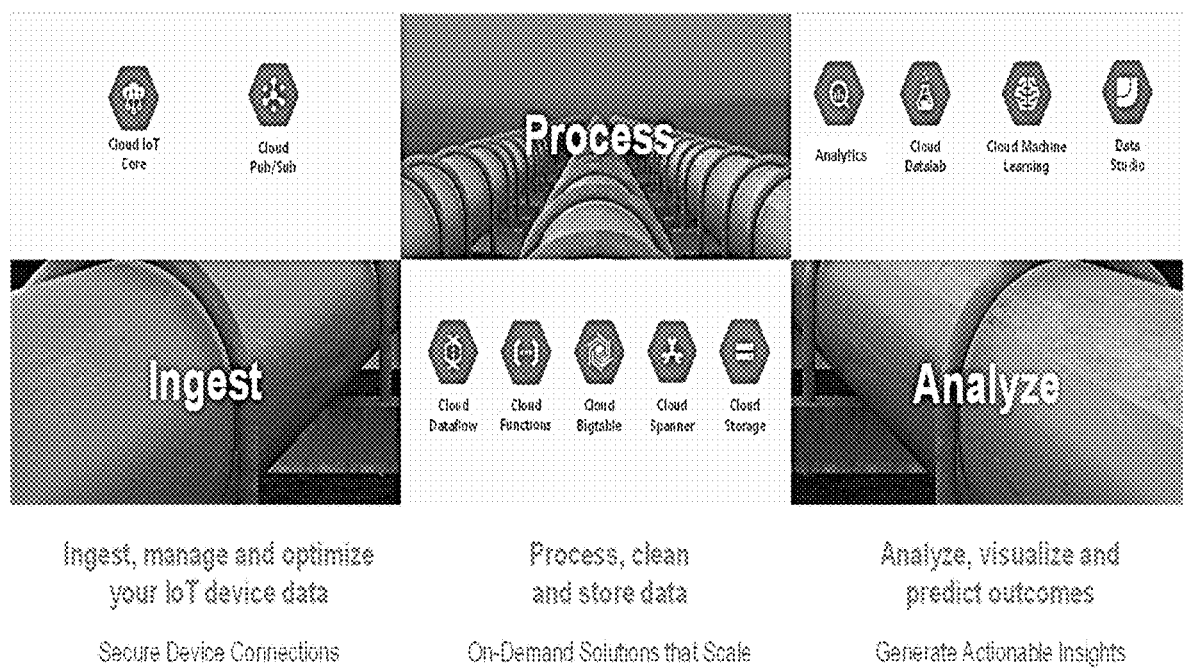
FIG. 21 illustrates a comprehensive Internet of Things (IoT) data processing platform according to one or more embodiments.

FIG. 21 illustrates a comprehensive IoT data processing platform according to one or more embodiments. On the path to fully adopting IoT capabilities, the system has a strong framework for data ingestion, storage, and analysis. The system utilizes the SCADA data that utilities are already collecting, performs data cleansing and validation, applies machine learning to form trend predictions and presents both historical data and predictions in an intuitive dashboard interface. Cloud services and APIs are there to automate uniform data set upload to the cloud data warehouse.

Figure 22:
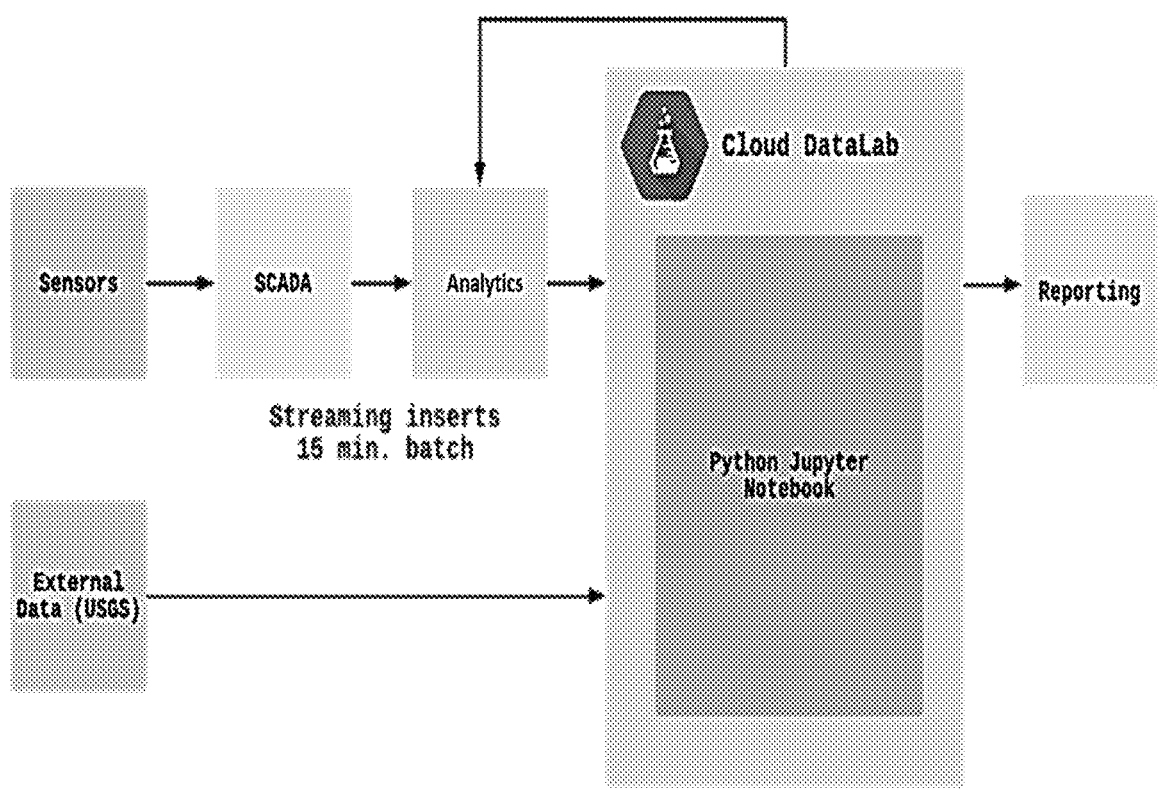
FIG. 22 illustrates a pilot architecture of the system.

FIG. 22 illustrates a pilot architecture. Further, FIG. 22 shows that the SCADA server collects data from different sources such as sensors and securely ingests it into the data storage subsystem (for example BigQuery® table). Further the query data storage system (Cloud Datalab) accepts data from data storage subsystem as well as external data such as USGS and performs analysis or modeling and develops the final report. An interactive tool for exploring, analyzing, transforming, and visualizing data and building machine learning models e.g., Cloud DataLab performs its functions using document sharing application e.g. Python Jupyter Notebook.

Figure 23:
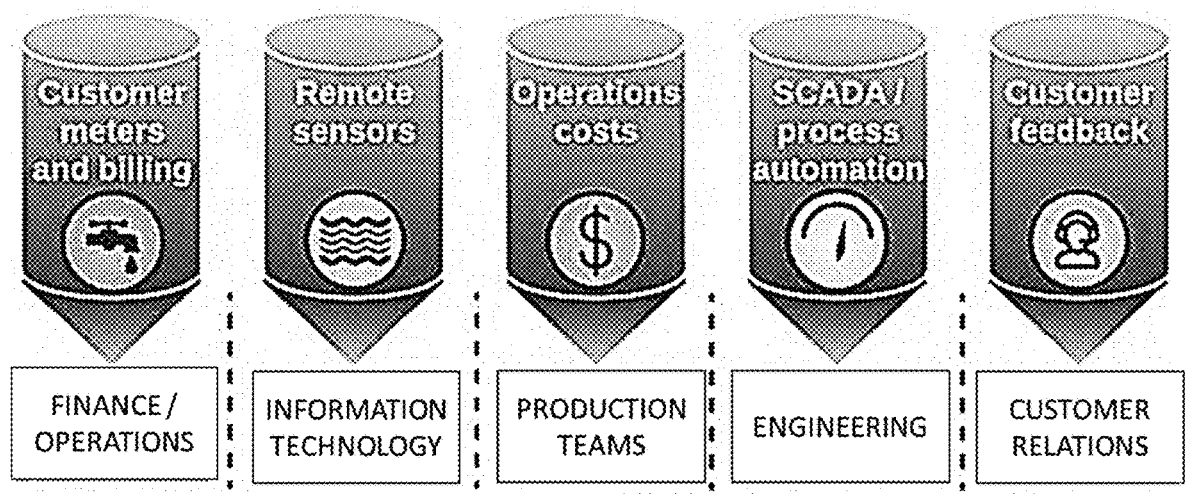
FIG. 23 illustrates data silos within water and wastewater utilities.

FIG. 23 illustrates data silos within water and wastewater utilities. Further, FIG. 23 shows how data typically sits across separate divisions throughout an organization. The smart water data analytics solution consolidates discrete systems to a centralized, robust, secure platform with advanced data processing tools. This solution helps to reduce operating costs while accurately predicting future trends, such as water quality, quantity, process operating parameters, and environmental impacts due to weather patterns. The solution's functionality provides vast benefits to all stakeholders associated with water and wastewater utilities, including the general public.

Figure 24:
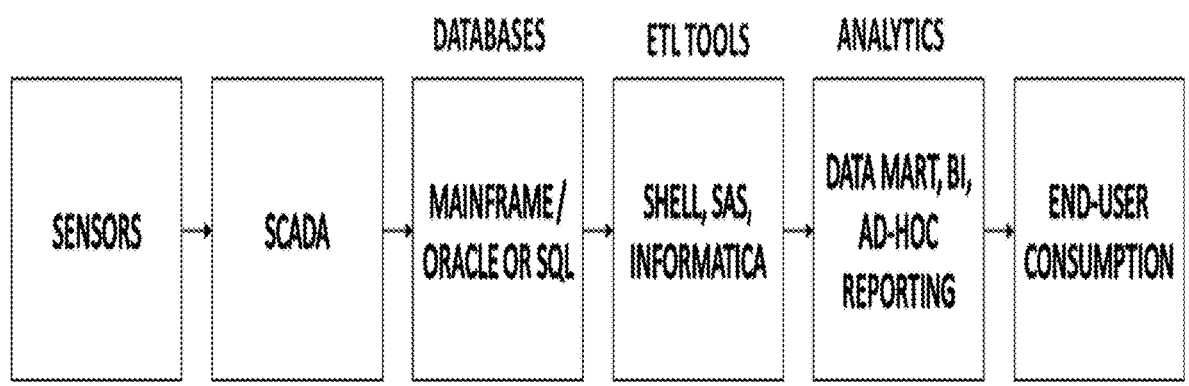
FIG. 24 illustrates legacy data architecture for analytics.

FIG. 24 illustrates legacy data architecture. Further, FIG. 24 illustrates that Extract Transform Load (ETL) extract data from source systems which may include data from but not limited to sensors, SCADA systems, and enforces data quality and consistency standards, conforms data so that separate sources can be used together, and finally provides ad hoc analytics so that application developers can build applications and end users can make decisions.

In an embodiment, the system is applicable for any one of industry type, data type, and use case.

In another embodiment, the system is applicable in water treatment plants.

In another embodiment, the system processes utility data.

In an embodiment, the system is for the remediation of contaminated soils, groundwater, and water.

In an embodiment, different types of soils may be treated including, for example, sand, rock, sediment, loam, and clay. Waters that can be treated include, for example, groundwater, wastewater, process water, and runoff.

In an embodiment, contaminants that can be remediated include, but are not limited to, solvents, heavy metals, pesticides, herbicides, fungicides, preservatives, wood preservatives, munitions, explosives, chemical warfare agents, fuels, oils, greases, pharmacologicals, Endocrine-Disrupting Chemicals (EDC) and viral and/or microbial agents. Classes of organic compounds that can be treated include both dense and light Non-Aqueous Phase Liquids (NAPL), dissolved or sorbed organic compounds, volatile organics, semi-volatile organics, chlorinated volatile organics, non-volatile organics, halogenated organics, fuels such as gasoline, diesel fuel, and jet fuel and Benzene, Ethylbenzene, Toluene and Xylene (BTEX). Specific compounds that can be remediated include, for example, polychlorinated biphenyl (PCB); tetrachloroethylene (PCE), trichloroethylene (TCE), trichloroethane (TCA), dichloroethene (DCE), chlorophenol, vinyl chloride, methyl tert-butyl ether (MTBE), tertiary butyl alcohol (TBA), polynuclear aromatic hydrocarbons (PAHs), dioxins, furans, ethylene dibromide (EDB); polybrominated diphenyl ethers, phthalates, DDT, bisphenol A, silvex and geosmin. Pharmaceuticals, personal care products (PCP), endocrine disruptors and waste containing these organic contaminants may also be remediated.

In an embodiment, the system is for the remediation of contaminated soils, groundwater, water, and/or waste using a combination of reagents. The disclosed methods may be used to treat various recalcitrant halogenated substances, such as perfluoroalkyls and polyfluoroalkyls. Particular combinations of reagents that may be used in the disclosed methods include but are not limited to: (1) persulfate, oxygen and ozone; (2) persulfate, salt, oxygen and ozone; (3) persulfate, phosphate, and/or oxygen; (4) persulfate, phosphate, oxygen and ozone; (5) persulfate, phosphate, salt and oxygen (6) persulfate, phosphate, salt, oxygen and ozone; (7) oxygen and salt; and (8) air and salt.

In an embodiment, techniques are provided for detecting sources of water contamination.

One or more embodiments provide a cloud computing based solution for identifying and assessing contamination events and determining the contamination source using minimum necessary measurements at optimized locations, leveraging IoT infrastructure. The solution augments the use of conventional technology (e.g., static sensor network, customer reports) with the use of complementary technology (e.g., social media, crowdsensing, weather reports, mobile sensor network) for contamination assessment.

In one or more embodiments, the artificial intelligence algorithms include at least one of natural language processing, image and video processing, crowdsensing data processing, computational fluid dynamics, optimization routines and statistics. In response to the data from the test devices and the conventional plus complementary sources of information, the cloud application can estimate locations of source(s) of contamination in the liquid distribution system.

In an embodiment, predictions of any one of future and otherwise unknown events means that the predictive analytical subsystem supplements the future planning of organizations through the availability of historic data and predictive trends. The present system can also be used to address potential problems, comprising aging infrastructure, water scarcity, and water quality before they even occur.

In an embodiment, the database or data stores may reside in a storage-area network ("SAN").

In an embodiment, the database may be any type of database, such as relational, hierarchical, object-oriented, and/or the like.

In an embodiment, the data warehouse subsystem may be implemented as SaaS, IaaS, and PaaS for a multi-tenant environment, which supports multiple system users on a single deployment of the warehouse, allowing each user to manage an independent meta-data model designed specifically for their particular data.

In an embodiment, the data warehouse subsystem receives data inputs from multiple sources and creates ready-to-use-sets of data marts based on defined business rules.

In an embodiment a data lake may reside on a cloud infrastructure (e.g., a private cloud, or a public cloud that offers infrastructure-as-a-service).

In an embodiment, the data lake may comprise any data storage technology. Preferably, the data lake allows data to be stored in an unstructured or flexibly structured manner. For example, the repository or data lake may not require a fixed or pre-defined data schema. The data lake may be (or may include) a NoSQL or other non-relational database, such as a document-oriented database storing data as "document" data objects (e.g. JSON documents), a key-value store, a column-oriented database, a file system storing flat files, or any other suitable data store or combination of any of the above.

In an embodiment, the data lake could alternatively include a conventional structured database such as a relational database or object database.

In an embodiment, the data lake may be implemented as a Hadoop data repository employing a Hadoop Distributed File System (HDFS) with an Apache Hive data warehousing infrastructure.

In an embodiment, a feed-forward process control system comprises one or more sensors for generating an alarm in response to an event that results in one of waste, machine delay, decreased product quality, pollution etc.

In an embodiment, a data logger is associated with the feed-forward process control system for obtaining an event parameter associated with the event.

In an embodiment, a feed-forward control system then allows the machine to anticipate the problem areas in the operations.

In an embodiment, feed-forward process control technology may be applied to adjust the process in anticipation of changes in the environment. Other suitable process control strategies may be used as well.

In an embodiment, a dashboard can be a voice-controlled dashboard. dashboard provides a set of functions (e.g., menus, buttons, etc.) that can be invoked through voice commands; these functions may manipulate the display of the dashboard and/or direct the dashboard to perform one of its operations or functions. This invoking a dashboard function includes opening and closing modalities and/or dashboards, minimizing and maximizing modalities and/or dashboards, rearranging locations of modalities and/or dashboards on screen, inputting data, etc.

In an embodiment, a dashboard can be a mashup dashboard. the mashup dashboard interacting with the user to selectively plug in mashups from the repository by manual manipulation at the display interface. a same mashup dashboard being re-schemed for different users, while a tab configuration and layout of the same mashup dashboard is persistent for the different users. A mashup dashboard can be driven through certain APIs that are in the mashup server.

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

INCORPORATION BY REFERENCE

All patents, patent application publications, and non-patent literature mentioned in the application are incorporated by reference in their entirety.
U.S. Pat. No. 7,032,816B2 entitled "Communication between machines and feed-forward control in event-based product manufacturing";
US20180068083A1 entitled "Methods and machine learning systems for predicting the likelihood or risk of having cancer";
US20150228012A1 entitled "System and method for enabling product development";
U.S. Pat. No. 5,953,424A entitled as "Cryptographic system and protocol for establishing secure authenticated remote access";
US20190386828A1 entitled as "Device and method sharing a matrix for use in a cryptographic protocol";
U.S. Pat. No. 8,838,957B2 entitled as "Stateless cryptographic protocol-based hardware acceleration";
U.S. Ser. No. 10/406,399B2 entitled as "Portable wireless mobile device motion picture data mining system and method";

US20190069022A1 entitled as "Data mining system for agreement compliance-controlled information throttle";
U.S. Pat. No. 8,688,459B2 entitled as "Voice-controlled clinical information dashboard";
U.S. Pat. No. 8,458,596B1 entitled as "Method and apparatus for a mashup dashboard";
U.S. Pat. No. 9,147,296B2 entitled as "Customization of vehicle controls and settings based on user profile data";
US20190377743A1 entitled as "Generating a multi-column index for relational databases by interleaving data bits for selectivity";
U.S. Ser. No. 10/235,439B2 entitled as "Systems and methods for data warehousing in private cloud environment";
U.S. Ser. No. 10/135,705B2 entitled as "Industrial internet of things data pipeline for a data lake";
U.S. Ser. No. 10/831,726B2 entitled as "System for importing data into a data repository";
US20200065759A1 entitled as "Methods and apparatus for managing, displaying analyzing, coordinating, optimizing, innovation, engineering, manufacturing, and logistics infrastructures"; U.S. Pat. No. 9,460,184B2 entitled as "Application of a differential dataset to a data store using sequential change sets";
US20100198804A1 is entitled as "Security management for data virtualization system";
US20190383783A1 is entitled as "Detecting contamination sources in liquid distribution systems";
U.S. Ser. No. 10/954,144B2, is entitled as "Soil and water remediation method and apparatus for treatment of recalcitrant halogenated substances";
US20130087512A1 is entitled as "Soil and water remediation method and apparatus"; U.S. Pat. No. 7,667,087B2 is entitled as "Soil and water remediation method and apparatus".

What is claimed is:

1. A system comprising:
a centralized data acquisition subsystem configured to receive input data from one or more data silos, wherein the centralized data acquisition subsystem includes a processor;
a data storage subsystem configured to process, and store the received input data in a memory;
a bridge application subsystem configured to securely ingest the received input data from the centralized data acquisition subsystem into the data storage subsystem for machine learning and predictive analysis to improve the centralized data acquisition subsystem, wherein the bridge application subsystem comprises a custom bridge program subscription;
a data refining subsystem that is connected to the data storage subsystem and configured to refine the input data acquired by the data storage subsystem to determine abnormal data, remove the abnormal data in response to a received analysis result from error analysis unit and store the refined input data after the refining;
a predictive analytical subsystem configured to generate output data using the refined input data from the data storage subsystem, process and compute the input data to automatically create a predictive model, wherein the predictive analytical subsystem comprises statistical techniques, predictive modelling, machine learning, or data mining that analyze current and historical facts to make predictions of any one of future and unknown events;
a dashboard interface subsystem operable to automatically access the input data in the data storage subsystem, analyze, generate metrics and periodical report based on the predictive model and the output data of the predictive analytical subsystem; and
a data visualization subsystem configured to generate, based on the predictive model, visual representation of data comprising one or more of graphs, charts, tables and reports, wherein the bridge application subsystem receives the input data in a format of multiple formats and multiple sources and processes the input data in the format effectively, wherein the format of the data is independent of the custom bridge program subscription.

2. The system of claim 1, wherein the centralized data acquisition subsystem, the data storage subsystem, the bridge application subsystem, the data refining subsystem, the predictive analytical subsystem, the dashboard interface subsystem, and the data visualization subsystem operate automatically.

3. The system of claim 1, wherein the centralized data acquisition subsystem comprises a Supervisory Control and Data Acquisition (SCADA) server.

4. The system of claim 3, wherein the data refining subsystem comprises an error analysis unit and an error data removal unit; wherein the error analysis unit analyzes the input data acquired by the SCADA server, determines abnormal data, and sends an analysis result to the error data removal unit; and wherein the error data removal unit removes the abnormal data.

5. The system of claim 3, wherein the data storage subsystem comprises any one of databases, data warehouses, and data lakes; wherein the data storage subsystem further comprises a cloud-based data storage subsystem; wherein the data is transmitted in a cloud vendor agnostic way to the cloud-based data storage subsystem; and wherein the data uploaded from the SCADA server to the cloud-based data storage subsystem is automatic and uniform.

6. The system of claim 3, wherein the system is configured with the machine learning to operate in an automated feed-forward manner.

7. The system of claim 3, wherein the predictive analytical subsystem analyzes one or more equipment and system data, wherein the data collected from sensors, the SCADA server, asset data, geospatial data, maintenance data, engineering data, and external data sets, and wherein the external data sets comprise any one of weather and terrain data.

8. The system of claim 1, wherein the dashboard interface subsystem comprises any one of web-based and mobile based dashboard interface subsystems; wherein the data displayed on the dashboard interface subsystem remains up to date, according to most recent data uploaded to the data storage subsystem; wherein the dashboard interface subsystem presents the output data using the input data in an easy-to-read view; and wherein a landing page of the dashboard interface subsystem serves as an overview of data stored in the data storage subsystem, giving users a concise view of the data.

9. The system of claim 1, wherein the predictive model is as applicable in water treatment plants.

10. The system of claim 9, wherein the one or more of graphs, charts, tables and reports are of one or more parameters; and wherein the parameters comprise one or more of pH, flow rate, turbidity, Oxidation Reduction Potential (ORP) and Dissolved Oxygen (DO).

11. The system of claim 9, wherein the received input data comprises environmental engineering data.

12. A non-transitory computer storage medium storing a sequence of instructions, which when executed by a processor, causes:
- receive, via a centralized data acquisition subsystem, input data from one or more data silos;
- process and store, via a data storage subsystem, the received input data in a memory;
- securely ingest, via a bridge application subsystem, the received input data from the centralized data acquisition subsystem into the data storage subsystem for machine learning and predictive analysis to improve the centralized data acquisition subsystem, wherein the bridge application subsystem comprises a custom bridge program subscription;
- refine, via a data refining subsystem that is connected to the data storage subsystem, the input data acquired by the data storage subsystem to determine abnormal data;
- remove, via an error remove unit, the abnormal data in response to a received analysis result from an error analysis unit and store refined input data after the refining;
- generate, via a predictive analytical subsystem, output data using the refined input data from the data storage subsystem for computing the input data to automatically create a predictive model, wherein the predictive analytical subsystem comprises statistical techniques, predictive modelling, machine learning, or data mining that analyze current and historical facts to make predictions of any one of future and unknown events;
- automatically access, via a dashboard interface subsystem, the input data in the data storage subsystem, analyze, generate metrics and report based on the predictive model and the output data of the predictive analytical subsystem;
- generate, via a data visualization subsystem based on the predictive model, visual representation of data comprising one or more of graphs, charts, tables and reports; and
- receive, via the bridge application subsystem, the input data in a format of multiple formats and multiple sources and processes the input data in the format effectively, wherein the format of the data is independent of the custom bridge program subscription.

13. The non-transitory computer storage medium of claim 12, wherein the centralized data acquisition subsystem, the data storage subsystem, the bridge application subsystem, the data refining subsystem, the predictive analytical subsystem, the dashboard interface subsystem, and the data visualization subsystem operate automatically.

14. The non-transitory computer storage medium of claim 12, wherein the centralized data acquisition subsystem comprises a Supervisory Control and Data Acquisition (SCADA) server.

15. The non-transitory computer storage medium of claim 14, wherein the data refining subsystem comprises an error analysis unit and an error data removal unit; wherein the error analysis unit analyzes the input data acquired by the SCADA server, determines abnormal data, and sends an analysis result to the error data removal unit; and wherein the error data removal unit removes the abnormal data.

16. The non-transitory computer storage medium of claim 14, wherein the data storage subsystem comprises any one of databases, data warehouses, and data lakes; wherein the data storage subsystem further comprises a cloud-based data storage subsystem; wherein the data is transmitted in a cloud vendor agnostic way to the cloud-based data storage subsystem; and wherein the data uploaded from the SCADA server to the cloud-based data storage subsystem is automatic and uniform.

17. The non-transitory computer storage medium of claim 14, wherein the system is configured with the machine learning to operate in an automated feed-forward manner.

18. The non-transitory computer storage medium of claim 14, wherein the predictive analytical subsystem analyzes one or more equipment and system data, wherein the data collected from sensors, the SCADA server, asset data, geospatial data, maintenance data, engineering data, and external data sets, and wherein the external data sets comprise any one of weather and terrain data.

19. The non-transitory computer storage medium of claim 12, wherein the dashboard interface subsystem comprises any one of web-based and mobile based dashboard interface subsystems; wherein the data displayed on the dashboard interface subsystem remains up to date, according to most recent data uploaded to the data storage subsystem; wherein the dashboard interface subsystem presents the output data using the input data in an easy-to-read view; and wherein a landing page of the dashboard interface subsystem serves as an overview of data stored in the data storage subsystem, giving users a concise view of the data.

20. The non-transitory computer storage medium of claim 12, wherein the predictive model is as applicable in water treatment plants.

* * * * *